(12) United States Patent
Farkash et al.

(10) Patent No.: US 9,213,847 B2
(45) Date of Patent: Dec. 15, 2015

(54) COMPUTER-IMPLEMENTED METHOD AND APPARATUS FOR ENCODING NATURAL-LANGUAGE TEXT CONTENT AND/OR DETECTING PLAGIARISM

(75) Inventors: Eyal Farkash, Raanana (IL); Naomi Magen, Jerusalem (IL); Erez Waisbard, Or-Yehuda (IL); Eliphaz Hibshoosh, Tel Aviv (IL)

(73) Assignee: CISCO TECHNOLOGY, INC., San Jose, CA (US)

(*) Notice: Subject to any disclaimer, the term of this patent is extended or adjusted under 35 U.S.C. 154(b) by 221 days.

(21) Appl. No.: 13/997,916

(22) PCT Filed: Sep. 7, 2011

(86) PCT No.: PCT/IB2011/053907
§ 371 (c)(1),
(2), (4) Date: Jul. 15, 2013

(87) PCT Pub. No.: WO2012/146955
PCT Pub. Date: Nov. 1, 2012

(65) Prior Publication Data
US 2014/0075566 A1    Mar. 13, 2014

(30) Foreign Application Priority Data

Apr. 28, 2011    (GB) .................... 1107116.4

(51) Int. Cl.
  G06F 17/21    (2006.01)
  G06F 21/60    (2013.01)
  G06F 17/30    (2006.01)
(52) U.S. Cl.
  CPC .......... *G06F 21/60* (2013.01); *G06F 17/30613* (2013.01); *G06F 17/21* (2013.01)
(58) Field of Classification Search
  CPC .................................................. G06F 17/21

USPC .......................................................... 726/26
See application file for complete search history.

(56) References Cited

U.S. PATENT DOCUMENTS

| 5,613,014 | A | 3/1997 | Eshera et al. |
| 5,953,415 | A | 9/1999 | Nielsen |

(Continued)

FOREIGN PATENT DOCUMENTS

| CN | 101441620 A | 5/2009 |
| KR | 20020009077 A | 2/2002 |

OTHER PUBLICATIONS

Aug. 25, 2011 Office Communication in connection with prosecution of GB 1107116.4.

(Continued)

*Primary Examiner* — Jacob Lipman
(74) *Attorney, Agent, or Firm* — Hahn Loeser & Parks, LLP

(57) ABSTRACT

A computer-implemented letter-based method of encoding a length-significant portion of natural language text to generate a letter-based fingerprint of the text portion, the method including detecting letter-based locations of occurrences of pre-determined single-letter and/or multi-letter pattern(s) within the length-significant portion, the detecting being carried out such that at least some occurrences are detected in a word-boundary independent manner that does not depend on locations of word-word boundaries, for a pattern occurrence letter-position signal which describes letter positions of the occurrences of the patterns within the text portion, computing frequency-dependent absolute or relative magnitudes of signal strength for a plurality of frequencies, the computed magnitudes representing letter-based frequencies of the pattern occurrences within the natural language text portion, and storing the computed signal strength magnitudes at the plurality of frequencies, the generated fingerprint comprising the stored signal strength magnitudes. Related apparatus and methods are also described.

15 Claims, 27 Drawing Sheets

(56) References Cited

U.S. PATENT DOCUMENTS

| | | | |
|---|---|---|---|
| 6,363,381 | B1 | 3/2002 | Lee et al. |
| 6,396,921 | B1 | 5/2002 | Longster |
| 2003/0074183 | A1* | 4/2003 | Eisele .............................. 704/1 |
| 2006/0285172 | A1 | 12/2006 | Hull et al. |
| 2008/0033913 | A1 | 2/2008 | Winburn |
| 2008/0059426 | A1* | 3/2008 | Brock et al. ...................... 707/3 |
| 2008/0178302 | A1 | 7/2008 | Brock et al. |

OTHER PUBLICATIONS

Feb. 7, 2012 Office Communication in connection with PCT/IB2011/053907.

Jun. 15, 2012 Transmittal of International Search Report and Written Opinion of International Searching Authority for the captioned application.

Charles S. Ahn, *Automatically Detecting Authors' Native Language*; (Naval Postgraduate School, Monterey CA, Mar. 2011).

Amir Amihood et al., "Efficient Text Fingerprinting Via Parikh Mapping."

Sergio Flesca et al., "Fast Detection of XML Structural Similarity" *IEEE Transactions in Knowledge and Data Engineering*, vol. 17, No. 2 (Feb. 2005).

Lucy McKeever, "Online Plagiarism Detection Services—Saviour or Scourge?" (Newcastle Upon Tyne, 2004).

Donald Metzler et al., "Similarity Measures for Tracking Information Flow" *CIKM '05*, pp. 517-524 (2005).

Saul Schleimer et al., "Winnowing: Local Algorithms for Document Fingerprinting" *SIGMOD 2003*, pp. 76-85 (Jun. 2003).

Jangwon Seo et al., "Local Text Reuse Detection" *SIGIR '08* (Jun. 2008).

Geraldo Xexeo et al., "Using Wavelets to Classify Documents" *2008 IEEE/WIC/ACM International Conference on WEB Intelligence and Intelligent Agent Technology*, pp. 272-278 (IEEE, 2008).

"Attributor Unveils Content Monitoring and Analysis Platform to Track Copied Content Across the Internet" (Nov. 5, 2007).

"Set Your Content Free (And Monetize It)" (Attributor).

\* cited by examiner

Case 1 : Implementation of step S101

Remove S201 white space
And punctuation; map all letters to
lowercase to obtain string of letters
STR=concat(S[1]S[2]...S[N])

For sub-string SUB=concat(S[j]S[j+1]...S[k])

*i, j* and *k* are positive integers
$$1 \leq j \leq i \leq k \leq N$$

Individually transform S215 each letter S[*i*]
from a 26-letter natural
language alphabet to a binary alphabet {0,1}
Such that:
(i) Each 'e' is mapped to '1'
→ (if S[i]=='e') map S[i] to '1'
(ii) Each letter other than 'e' is mapped to a '0'
(if S[i]!='e') map S[i] to '0'

FIG. 2A

Case 2 : Implementation of step S101

Remove S201 white space
And punctuation; map all letters to
lowercase to obtain string of letters
$STR=concat(S[1]S[2]...S[N])$
Where $N$ is a positive integer For sub-string $SUB=concat(S[j]S[j+1]...S[k])$ $i, j$ and $k$ are positive integers $$1 \leq j \leq i \leq k \leq N$$

Individually transform S225 each letter $S[i]$
from a 26-letter natural
language alphabet to a binary alphabet {0,1}
Such that:
(i) Each 'e' is mapped to '1'
→ (if S[i]=='e') map S[i] to '1'

(ii) Each 'a' is mapped to '1';
→ (if S[i]=='a') map S[i] to '1'

(iii) Each letter other than 'e' and 'a'
is mapped to a '0'
(if S[i]!='e' && S[i]!='a') map S[i] to '0'

FIG. 3A

Case 3 : Implementation of step S101

Remove S201 white space
And punctuation; map all letters to
lowercase to obtain string of letters
$STR=concat(S[1]S[2]...S[N])$
Where $N$ is a positive integer For sub-string $SUB=concat(S[j]S[j+1]...S[k])$ $i, j$ and $k$ are positive integers
$$1 \leq j \leq i \leq k \leq N$$

Individually transform S235 each letter $S[i]$
from a 26-letter natural
language alphabet to a binary alphabet {0,1}
Such that:
(i) Each letter $S[i]$ is mapped to '1'
if and only the letter $S[i]$ is a vowel AND the
Immediate predecessor letter $S[i-1]$
is an 's' or a 't'
→ (if IS_VOWEL(S[i]) &&
(S[i-1]=='s' || S[i-1]=='t')) map S[i] to '1'

(ii) Each other letter (including 's' and 't')
is mapped to '0'

FIG. 4A

Case 4 : Implementation of step S101

Remove S201 white space
And punctuation; map all letters to
lowercase to obtain string of letters
*STR=concat(S[1]S[2]…S[N])*
Where *N* is a positive integer For sub-string *SUB =concat(S[j]S[2]…S[k])*

$i, j$ and $k$ are positive integers $$1 \leq j \leq i \leq k \leq N$$

Individually transform S245 each letter S[i]
from a 26-letter natural
language alphabet to a binary alphabet {0,1}
Such that:
(i) Each letter *S[i]* is mapped to '1'
if and only the concatenation concat(*S[i-1],S[i]*)
Is one of the 13 most common bigrams (ii) Each other letter is mapped to '0'

FIG. 5A

Case 5 : Implementation of step S101

Remove S201 white space
And punctuation; map all letters to
lowercase to obtain string of letters
STR=concat(S[1]S[2]...S[N])
Where N is a positive integer For a sub-string SUB =concat(S[j]S[2]...S[k])

i, j and k are positive integers $1 \leq j \leq i \leq k \leq N$

Individually transform S255 each letter S[i]
from a 26-letter natural
language alphabet to a binary alphabet {0,1}
Such that:
(i) Each letter S[i] is mapped to '1'
if and only the letter S[i] is a vowel
AND the letter S[i-2] before the immediate
Predecessor is also a vowel -
→ If(IS_VOWEL(S[i]) && IS_VOWEL(S[i-2]))
Then S[i] is mapped to '1'; and
(ii) Each other letter is mapped to '0'

FIG. 6A

Case 6 : Implementation of step S101

Remove S201 white space
And punctuation; map all letters to
lowercase to obtain string of letters
*STR=concat(S[1]S[2]…S[N])*
Where *N* is a positive integer For sub-string *SUB =concat(S[j]S[2]…S[k])*

*i, j* and *k* are positive integers $$1 \leq j \leq i \leq k \leq N$$

Individually transform S265 each letter S[i]
from a 26-letter natural
language alphabet to a binary alphabet {0,1}
Such that:
(i) Each 'e' is mapped to '2'
→ (if S[i]=='e') map S[i] to '2'
(ii) Each 's' is mapped to '1';
→ (if S[i]=='s') map S[i] to '1'
(iii) Each letter other than 'e' and 's'
is mapped to a '0'
(if S[i]!='e' && S[i]!='s') map S[i] to '0'

FIG. 7A

Case 7 : Implementation of step S101

Remove S201 white space
And punctuation; map all letters to
lowercase to obtain string of letters
$STR=concat(S[1]S[2]...S[N])$
Where $N$ is a positive integer For sub-string $SUB=concat(S[j]S[j+1]...S[k])$ $i, j$ and $k$ are positive integers
$$1 \leq j \leq i \leq k \leq N$$

Individually transform S275 each letter $S[i]$
from a 26-letter natural
language alphabet to a binary alphabet {0,1}
Such that:
(i) Each 't' is mapped to '1'
 (if S[i]=='e') map S[i] to '1'

(ii) Each 'a' is mapped to '1';
 (if S[i]=='a') map S[i] to '1'

(iii) Each letter other than 't' and 'a'
is mapped to a '0'
(if S[i]!='t' && S[i]!='a') map S[i] to '0'

FIG. 8

Case 8 : Implementation of step S101

Remove S201 white space and punctuation; map all letters to lowercase to obtain string of Letters *STR=concat(S[1]S[2]...S[N])*

For sub-string *SUB=concat(S[j]S[j+1]...S[k])*

$i, j$ and $k$ are positive integers $$1 \leq j \leq i \leq k \leq N$$

Individually transform S295 each letter $S[i]$ such that
(i) 'a' maps to .001; (ii) 'b' maps to .002;
(i) 'c' maps to .003; (ii) 'd' maps to .004;
(i) 'e' maps to 1.0; (ii) 'f' maps to .006;
(i) 'g' maps to .007; (ii) 'h' maps to .008;
(i) 'i' maps to .009; (ii) 'j' maps to .010;
(i) 'k' maps to .011; (ii) 'l' maps to .012;
(i) 'm' maps to .013; (ii) 'n' maps to .014;
(i) 'o' maps to .015; (ii) 'p' maps to .016;
(i) 'q' maps to .017; (ii) 'r' maps to .018;
(i) 's' maps to .019; (ii) 't' maps to .02;
(i) 'u' maps to .021; (ii) 'v' maps to .022;
(i) 'w' maps to .023; (ii) 'x' maps to .024;
(i) 'y' maps to .025; (ii) 'z' maps to .026;

FIG. 9A

Case 9 : Implementation of step S101

Remove S201 white space and punctuation; map all letters to lowercase to obtain string of Letters *STR=concat(S[1]S[2]...S[N])*

For sub-string *SUB=concat(S[j]S[j+1]...S[k])*

$i, j$ and $k$ are positive integers $$1 \leq j \leq i \leq k \leq N$$

Individually transform S297 each letter S[$i$] such that
(i) 'a' maps to .01; (ii) 'b' maps to .02;
(i) 'c' maps to .03; (ii) 'd' maps to .04;
(i) 'e' maps to 1.0; (ii) 'f' maps to .06;
(i) 'g' maps to .07; (ii) 'h' maps to .08;
(i) 'i' maps to .09; (ii) 'j' maps to .10;
(i) 'k' maps to .11; (ii) 'l' maps to .12;
(i) 'm' maps to .13; (ii) 'n' maps to .14;
(i) 'o' maps to .15; (ii) 'p' maps to .16;
(i) 'q' maps to .17; (ii) 'r' maps to .18;
(i) 's' maps to .19; (ii) 't' maps to .2;
(i) 'u' maps to .21; (ii) 'v' maps to .22;
(i) 'w' maps to .23; (ii) 'x' maps to .24;
(i) 'y' maps to .25; (ii) 'z' maps to .26;

FIG. 10A

COMPUTER-IMPLEMENTED METHOD AND APPARATUS FOR ENCODING NATURAL-LANGUAGE TEXT CONTENT AND/OR DETECTING PLAGIARISM

RELATED APPLICATION INFORMATION

The present application is a 35 USC §371 application of PCT/IB2011/053907, filed on 7 Sep. 2011 and entitled "COMPUTER-IMPLEMENTED METHOD AND APPARATUS FOR ENCODING NATURAL-LANGUAGE TEXT CONTENT AND/OR DETECTING PLAGIARISM", which was published on 1 Nov. 2012 in the English language with International Publication Number WO 2012/146955 and which relies for priority on UK Patent Application 1107116.4 filed 28 Apr. 2011.

FIELD OF THE INVENTION

The present invention relates to methods, apparatus and computer-readable medium for encoding natural language text and/or for detection of plagiarism of natural language text document(s).

BACKGROUND OF THE INVENTION

Content Piracy

Content piracy is, unfortunately, big business. According to a 2010 study from the company Attributor, the value of downloads of pirated eBook content was estimated to be about $2.8 billion, or about 10% of the total sales of books within the United States.

In January 2010, the Software & Information Industry Association (SIIA), the principal trade association for the software and content industry, launched a Reward Program for its Corporate Content Anti-Piracy Program (CCAP). This program awards individuals reporting content piracy up to $1 million for their findings.

According to said Keith Kupferschmid, SIIA's VP of Intellectual Property Policy and Enforcement, "SIIA was the first trade association to offer cash rewards to sources who report software piracy in U.S. companies . . . . The rewards program has proven to be a very useful tool in encouraging individuals to provide accurate and reliable reports of software theft. We believe that extending it to content piracy will raise awareness of the problem of content piracy and help us spread the message that content piracy is just as wrong as movie, music or software piracy."

There is an ongoing need for tools and techniques for detecting content piracy of natural language text documents, including but not limited to eBook documents and news articles.

The following references are also believed to represent the state of the art:

U.S. Pat. No. 5,613,014 to Eshera, et al.;
U.S. Pat. No. 5,953,415 to Nielsen;
U.S. Pat. No. 6,363,381 to Lee, et al.;
U.S. Pat. No. 6,396,921 to Longster;
US Published Patent Application 20030074183 of Eisele;
US Published Patent Application 2006/0285172 of Hull, et al.;
US Published Patent Application 2008/0033913 of Winburn; and
Korean Patent Application 20020009077 of Kim Whoi Yul, et al.

SUMMARY OF THE INVENTION

The present invention, in certain embodiments thereof, seeks to provide improved encoding of natural language text and/or detection of plagiarism of natural language text document(s).

A computer-implemented letter-based method of encoding a length-significant portion of natural language text to generate a letter-based fingerprint of the text portion is now disclosed for the first time. The method comprises: a. detecting, by digital computer, letter-based locations of occurrences of pre-determined single-letter and/or multi-letter pattern(s) within the length-significant portion of the natural language text, the detecting being carried out such that at least some occurrences are detected in a word-boundary independent manner that does not depend on locations of word-word boundaries; b. for a pattern occurrence letter-position signal which describes letter positions of the occurrences of the patterns within the text portion, computing frequency-dependent absolute or relative magnitudes of signal strength for a plurality of frequencies, the computed magnitudes representing letter-based frequencies of the pattern occurrences within the natural language text portion; and c. storing within volatile and/or non-volatile computer memory descriptions of the computed signal strength magnitudes at the plurality of frequencies, the generated fingerprint comprising the stored signal strength magnitudes, wherein the length-significant portion of natural language text includes at least 250 natural language letters and at least 10 natural language words.

In some embodiments, the signal strength magnitude values are stored in step (c) as part of the generated fingerprint so as to be correlated by frequency.

In some embodiments, the detecting of step (a) is carried out such that a majority of occurrences of the single-letter and/or multi-letter pattern are detected in a word-boundary independent manner.

In some embodiments, the pattern occurrence position signal is substantially a two-level level signal such that: for a majority of the letter positions within the length-significant portion of natural language text, a value of the pattern occurrence-position signal is substantially equal to one of the two values within a tolerance that does not exceed 20% of a difference between the two values.

In some embodiments, the pattern occurrence position signal is biased so that: i. the pattern occurrence position signal is substantially equal to a first level selected from the two levels for a fraction of letter positions within the significant portion of natural language text; ii. the pattern occurrence position signal is substantially equal to a second frequency of letter positions within the significant portion of natural language text, the second level being significantly different from the first level; iii. the first frequency is between 0.05 and 0.30; iv. the second frequency exceeds the first frequency; and v. the sum of the first and second frequencies exceeds 0.5 and/or a ratio between the second frequency and the first frequency is at least at least 2:1.

In some embodiments, the pattern occurrence letter-position signal includes less information than the natural language text portion.

In some embodiments, the method is carried out in response to a user attempt to open for viewing natural language text of the length-significant portion and/or in response to a receiving of the natural language text document into a client device.

In some embodiments, the method further comprises: d. contingent upon a comparison of a description of the letter-based fingerprint with a counterpart derived from a different natural language text document different from the text document of the length-significant portion, visually displaying natural language text of the length-significant portion on a visual display device.

In some embodiments, i. the computing of step (b) includes computing signal strength magnitude-phase values for a frequency sequence FREQ_SEQ of N consecutive frequencies $F_1 \ldots F_N$ to obtain N signal magnitude-phase values $MAG_1 \ldots MAG_N$, N being a positive integer greater than or equal to 3, each magnitude-phase value describing a signal strength magnitude and optionally phase information about its respective frequency; ii. the method further comprises computing, for the frequency sequence FREQ_SEQ, a magnitude-phase value trend direction sequence describing signs of changes in the signal magnitude-phase values {SGN $(MAG_2-MAG_1)$, $SGN(MAG_3-MAG_2)$, ... $SGN(MAG_N-MAG_{N-1})$} for the frequency sequence FREQ_SEQ of N consecutive frequencies; and iiii. the comparison is a relatively rough comparison that compares: A. a relatively rough description of the letter-based fingerprint comprising a lossless description of the magnitude-phase value trend direction sequence and whose size is less than 5 times the minimum data size required for the magnitude-phase value trend direction sequence; with B. one or more respective counterpart(s) derived from other natural language texts other than the natural language text of the length-significant portion.

In some embodiments, the method further comprises: d. for each different natural language text document of one or more different natural language text document(s) that are different from the natural language text document for which the fingerprint was generated in steps a-c: i. respectively providing, in volatile or non-volatile computer memory, a letter-based fingerprint associated with a portion of the different natural language text document; and ii. comparing, by digital computer, a description of the letter-based fingerprint with counterpart(s) derived from different natural language text document(s) that each differ from the natural language text of the length-significant portion, wherein the counterparts derived from the different natural language text document(s) are selected/and ordered in accordance with estimated likelihood of plagiarism.

In some embodiments, the method further comprises: e. contingent upon a detected dissimilarity between the fingerprint generated for the length-significant portion and their counterpart(s) for the different natural language text documents, visually displaying natural language text of the length-significant portion on a visual display device.

In some embodiments, i. the computing of step (b) includes computing signal strength magnitude-phase values for a frequency sequence FREQ_SEQ of N consecutive frequencies $F_1 \ldots F_N$ to obtain N signal magnitude-phase values $MAG_1 \ldots MAG_N$, N being a positive integer greater than or equal to 3, each magnitude-phase value describing a signal strength magnitude and optionally phase information about its respective frequency; and ii. the method further comprises: d. computing, for the frequency sequence FREQ_SEQ, a magnitude-phase value trend direction sequence describing signs of changes in the signal magnitude-phase values {SGN $(MAG_2-MAG_1)$, $SGN(MAG_3-MAG_2)$, ... $SGN(MAG_N-MAG_{N-1})$}; e. transmitting, to a comparison server array via a computer network, a first data object comprising a lossless description of the magnitude-phase value trend direction sequence, the first data objecting being a lightweight data object whose size is less than 5 times a minimum data size required to describe the magnitude-phase value trend direction sequence; and f. contingent upon results of a remote comparison between the first data object and respective counterpart(s) that are derived from other natural language text(s), transmitting to the comparison server array a second data object that more completely describes trends in the N signal magnitude-phase values $MAG_1 \ldots MAG_N$.

Some embodiments relate to apparatus that is configured to carry out any routine disclosed herein or any combination of such routines.

It is now disclosed for the first time apparatus for encoding a length-significant portion of natural language text to generate a letter-based fingerprint of the text portion, the length-significant portion of text including at least 250 natural language letters and at least 10 natural language words, the apparatus comprising: a. a volatile and/or non-volatile computer memory; b. a pattern-detection module configured to electronically detect letter-based locations of occurrences of pre-determined letter pattern(s) of one or more letters within the length-significant portion of the natural language text stored within the computer memory, the pattern-detection module configured to carried out the detecting such that at least some of occurrences are detected in a word-boundary independent manner that does not depend on locations of word-word boundaries; and c. a signal analysis module configured to compute, for a pattern occurrence letter-position signal describing letter positions of the occurrences of the patterns within the text portion, absolute or relative magnitudes of signal strength for a plurality of frequencies, the computed magnitudes representing letter-based frequencies of the pattern occurrences within the natural language text portion, wherein the computer memory is configured for storage of the letter-based fingerprint comprising descriptions of the computed signal strength magnitudes at the plurality of frequencies.

It is now disclosed for the first time a computer-implemented letter-based method of encoding a length-significant portion of natural language text to compute a letter-based fingerprint of the text portion, the method comprising: a. generating from the length-significant portion of natural language text, by digital computer, a letter-based derivative data object describing letter-based inter-letter distances within the text portion, the generating including the steps of: i. subjecting the text portion to a letter-based transformation operation where each source natural language letter is mapped into a respective source-letter-identity-dependent target in a manner that does not depend upon source letter position within its host word; ii. deriving the letter-based derivative data object according to the individual-letter targets; b. for a plurality of different frequencies, computing relative power magnitudes within a frequency domain representation of the derivative data object; and c. storing within volatile and/or non-volatile computer memory the letter-based fingerprint describing the computed relative power magnitudes at the plurality of frequencies.

In some embodiments, the letter-based data transformation is a one-way lossy data transformation.

It is now disclosed a computer-implemented method of estimating a likelihood of plagiarism between first and second natural language text documents, the method comprising; a. for each of the first and second natural language text documents, respectively generating, by digital computer, a respective substantially two-level signal describing textual patterns within a portion of natural language text; b. respectively subjecting each of the generated signals to frequency-domain analysis to compute, for each frequency of a plurality of frequencies, absolute or relative signal strengths at low non-DC frequencies; and c. comparing, for the first and second natural language text documents, results of the computed signal strengths at low non-DC frequencies, wherein the results of the comparison are indicative of a likelihood of plagiarism between the first and second natural language text documents.

BRIEF DESCRIPTION OF THE DRAWINGS

The present invention will be understood and appreciated more fully from the following detailed description, taken in conjunction with the drawings in which:

FIGS. 2A, 3A, 4A, 5A, 6A, 7A, 8, 9A and 10A are routines for generating a pattern-occurrence:letter-position signal from natural language text;

FIGS. 2B, 3B, 4B, 5B, 6B, 7B, 8, 9B, and 10B graphically describe the generated pattern-occurrence:letter-position signal from natural language text;

DETAILED DESCRIPTION OF EMBODIMENTS

Figure 1:
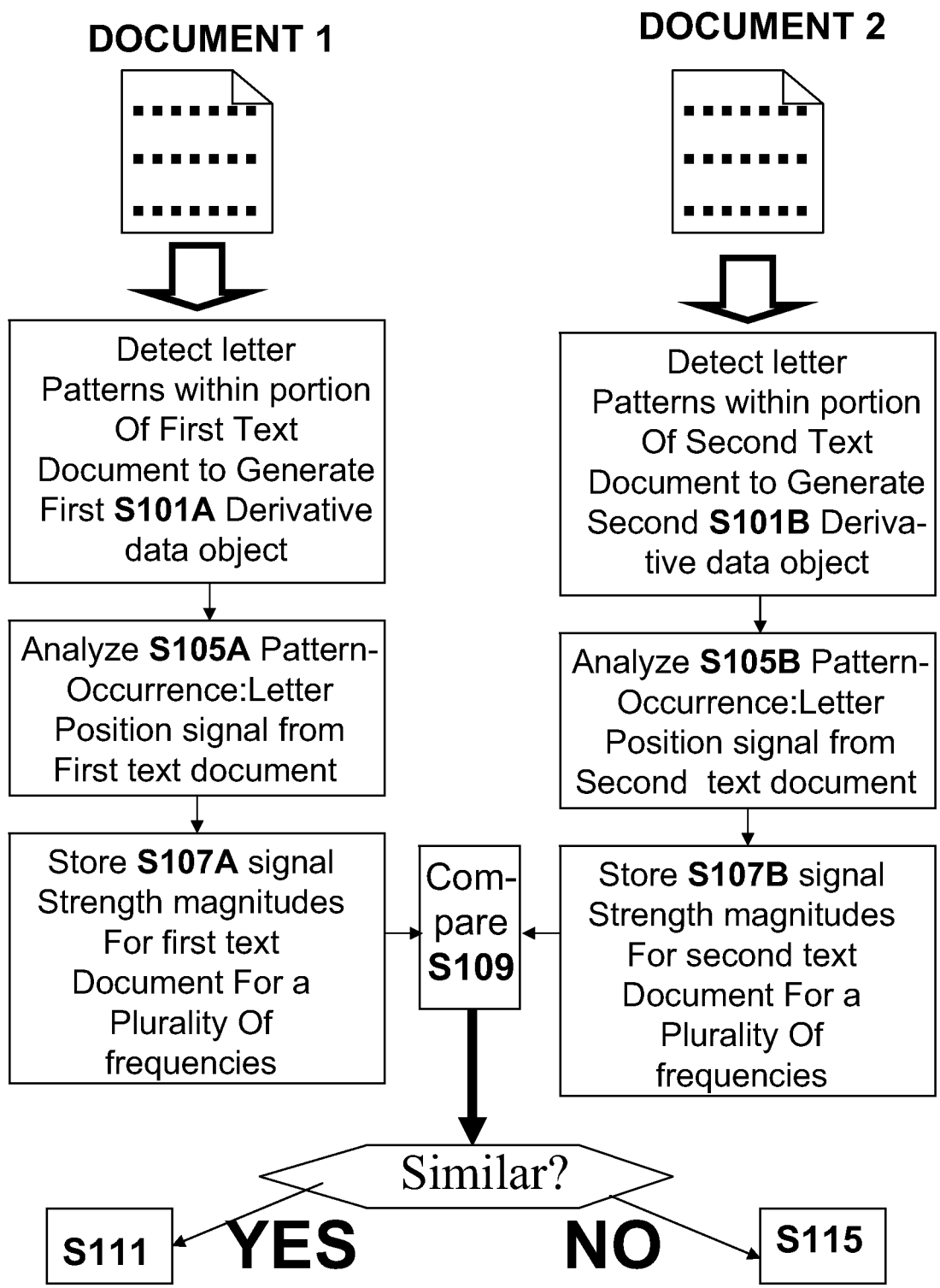
FIGS. 1, 11 and 14 are flow chart of a routine for generating and/or comparing letter-based and/or two-level and/or three-level fingerprints of natural language text documents.

Embodiments of the present invention relate to methods and apparatus for encoding and/or characterizing a 'length-significant' portion of a natural language text document (i.e. having at least 250 letters and at least 10 words wherein (i) natural language text of the length-significant portion is analyzed by digital computer to detect letter-based positions of occurrences of single- or multi-letter pattern(s) within the length-significant portion; and (ii) a frequency-domain representation of a pattern-occurrence:letter-position signal describing the detected letter-based positions is computed—for example, using a set of trigonometric and/or orthogonal and/or period functions as basis polynomials.

Examples of 'letter patterns' that may be detected include, but are not limited to, a single 'e' pattern (this is a 'single-letter pattern'—see FIG. 2A or 3A or 7A), a single 'a' pattern (this is a 'single-letter pattern'—see FIG. 3A), a two letter pattern whereby a vowel immediately follows an 's' or a 't' (this is a 'multi-letter pattern'—see FIG. 4A), a two letter pattern whereby a letter is the second letter of a common bigram (this is a 'multi-letter pattern'—see FIG. 5A), a two letter pattern whereby both a letter and the immediate predecessor of the letter's immediate predecessor are vowels (this is a 'multi-letter pattern'—see FIG. 6A), and a single 's' pattern (this is a 'single-letter pattern'—see FIG. 7A).

Experiments conducted with English-language natural language text have indicated that letter-based locations at which letter patterns occur provide a useful 'signal' that characterizes the text. According to 'experimental' observations, even when the natural language text is slightly modified (for example, to insert or delete or modify a small number of words), certain aspects of this signal are preserved. In some embodiments, this signal serves as the basis of a letter-based fingerprint of a portion of natural language text.

Embodiment of the present invention relate to 'letter-based' locations within the natural language text as opposed to 'word-based' locations. A discussion of the difference between 'letter-based' and 'word-based' locations is provided below in the 'definitions' section.

In the present disclosure, a "pattern-occurrence:letter position signal" is a signal describing letter-based positions of occurrences of the single-letter or multi-letter pattern(s) within a portion of natural language text. In one example, consider the sample text 'this path and that.' The letter positions of each letter of the sample text are shown below:

| t | h | i | s | p | a | t | h | a | n | d | t | h | a | t |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |

The 'single-letter pattern' a' occurs at the following letter-based positions—6, 9 and 14. In different examples, it is possible to express the "pattern-occurrence:letter position signal" as $\{6,9,14\}$ or as the string 000001001000010 (in this string, the $6^{th}$, $9^{th}$ and $14^{th}$ positions are occupied by 1's and the remaining positions are occupied by 0's) or graphically (see FIGS. 2B, 3B, 4B, 5B, 6B, 7B, 9B, 10B). In yet another example, it is possible to at least partially express the 'pattern-occurrence:letter position signal' as a sequence of distances between consecutive occurrences of the pattern—in the current example, the "pattern-occurrence:letter position signal" may be expressed by the position of the first 'a' along with the sequence $\{2,5\}$—the '2' is the number of letters other than 'a' between the first and second occurrences of 'a' and the '5' is the number of letters other than 'a' between the second and third occurrences of 'a.'

Not wishing to be bound by any theory, in accordance with some embodiments it has been found that even though the 'pattern-occurrence:letter position" signal may be relatively 'sparse' and may lack a significant amount of data provided by the original text, this 'pattern-occurrence:letter position" signal is still sufficient to provide information describing the 'uniqueness' of a portion of natural language text.

In some embodiments, this 'pattern-occurrence:letter position" signal is substantially a two-level signal (see FIGS. 2B, 3B, 4B, 5B, 6B, 9B and 10B) or a three-level signal (FIG. 7B) throughout all letter-locations of the natural language text portion, or at least for a majority of locations. Inspection of FIGS. 2B, 3B, 4B, 5B, 6B and 7B indicates that the amount of information in the 'pattern-occurrence:letter position' signal may be significantly less than the amount of information within the natural language text used to compute the 'pattern-occurrence:letter position' signal. This same effect may be observed in FIGS. 9B and 10B when it is possible to 'round off' points 'near' 0 to exactly 0.

In this sense, it may be said that, in some non-limiting embodiments, the data transformation from the natural language text string to a representation of the 'pattern-occurrence:letter position' signal has the potential to be a 'lossy' translation. Despite this potential for data loss, experiments have indicated, as noted above, that the 'pattern-occurrence:letter position' signal is a useful tool for detecting plagiarism.

As noted above, some embodiments relate to routines and apparatus whereby a frequency-domain representation of the 'pattern-occurrence:letter position' signal is computed to form the basis of a letter-based fingerprint. This 'frequency-domain representation' describes the absolute or relative magnitudes of signal strength for a plurality of frequencies including the 'lowest few non-DC frequencies.' Mathematical routines for computing the 'frequency-domain representation' of the pattern-occurrence:letter-position signal include, but are not limited to, discrete Fourier transformation (DFT), discrete cosine transformation (DCT), discrete sine transformation (DST), a fast Fourier transformation (FFT) and/or a wavelet transformation.

In an example discussed below with reference to text of Appendixes A-C and with reference to FIGS. 16-19, it is shown that a set of 6 'lowest-frequency non-DC' DFT coefficients representing the intensity of the signal at the lowest frequencies provides: (i) a very 'lightweight' data object whose size is much smaller than the original text portion but (ii) nevertheless, comparing these few coefficients representing intensity of the signal at the lowest non-DC frequencies can serve as the basis of detecting plagiarism of a text object.

It is noted that the DFT coefficients illustrated in FIGS. 16-19 do not necessarily represent only the magnitudes of signal strength but may include additional phase-related information. Thus, when a signal strength magnitude is computed, the computed magnitude may be part of a number(s) or other data object that describes additional information besides signal strength magnitude—for example, phase information. Nevertheless, it is clear that the DFT coefficient of FIGS. 16-19 do represent signal strength magnitudes.

In certain examples below, the DFT coefficients may be referred to as 'signal magnitude-phase values' since they represent the signal magnitudes and optionally also phase information.

The term 'letter-based' fingerprint relates to a data object characterizing one or more feature(s) of a natural language text object which is generated by detecting letter-based locations of occurrences (and/or letter-based distances between occurrences) of single-letter or 'multi-letter' patterns and/or by transforming or mapping individual letters partially or completely in a word-boundary independent manner.

In some embodiments, one or more and/or most and/or substantially all and/or all of the single-letter or multi-letter patterns are detected in a manner that does not depend on locations of word-word boundaries.

A 'word-word boundary' is a location within natural language text where there is a break between adjacent words.

One example relates to the sentence "This man and I sit on a chair." In this eight-word example, there are seven 'word-word boundaries'—a first boundary between the 's' of "this" and the 'm' of "man; a second boundary between the 'n' of "man" and the 'a' of "and"; a third boundary between the 'd' of "and" and the single-letter-word "I"; a fourth boundary between the single-letter-word "I" and the 's' of "sit"; a fifth boundary between the T of "sit" and the 'o' of "on"; a sixth boundary between the 'n' of "on" and single-letter-word 'a"; a seventh boundary between the single-letter-word 'a' and the 'c' of "chair."

For any given single-letter or multi-letter pattern, it is possible to detect the pattern either in a manner that is influenced by locations of word-word boundaries, or in a 'word-boundary-insensitive-manner.'

For example, for the 'single-letter-pattern' 'a', it is possible to detect the pattern in a 'word-boundary-sensitive-manner' or in a 'word-boundary-insensitive-manner.' For the case of word-boundary-insensitive-detection, the number of occurrences of the 'single-letter-pattern' 'a' within the natural language text string "this man and I sit on a chair" is 4—once in the word 'and,' once in the word 'man,' once in the single-letter-word "a," and once in the word 'chair.' For the alternate case of detection of the word 'a' (i.e. this is one example of detecting in a manner influenced by locations of word-word boundaries), it is noted that there are fewer than 4 occurrences of this word-boundary sensitive-detected letter pattern within the same text. In this case, the 'word a' only appears once in the natural language text string "this man and I sit on a chair."

In another example of word-boundary-sensitive example, it is possible to detect occurrences of the letter 'a' that only are within a larger host word—i.e. in this example, it is a requirement that the letter 'a' is part of a larger word and not a standalone single letter word. In this case, the letter 'a' pattern appears three times in the natural language text string "this man and I sit on a chair" (once in the word 'and,' once in the word 'man,' and once in the word 'chair').

The above examples related to single-letter patterns. In an example relating to multi-letter patterns, consider the multi-letter-pattern "he" and the natural language string "He hears me.' When detecting the multi-letter-pattern "he" in a word-boundary-insensitive manner, there are two occurrences. When detecting occurrences of the word 'he,' this is detection of the multi-letter-pattern "he" in a word-boundary-sensitive manner—in this case, there is a single occurrence.

One Non-Limiting Example "Letter-Based" Natural Language Text Transformation

According to some non-limiting examples, it is possible to detect locations of occurrences of single-letter or multi-letter patterns within a portion of natural language text by (i) eliminating white-space; and (ii) mapping or transforming each letter of the text portion to a respective 'target' symbol according to the content of the letter and optionally one or more 'context-related features' (i.e. for the case of 'multi-letter' patterns).

In one example related to 'context-independent' detection of a single letter, after eliminating white-space, it is possible to transform natural language letters into the binary 'alphabet' {0,1} as follows (see also FIG. 8, discussed below):

(i) all letters that are not "t" or "a" are mapped to "0";
(ii) all "t"s or "a"s are mapped to "1".

Additional examples of other letter-based transformations of natural language text are discussed below in more detail with reference to FIGS. 2-10.

Application of this letter-based transformation to the example phrase "this path and that" is illustrated in the table below—the first row is the natural language text and the second row is the results of mapping/transforming each natural language letter. After removing white-space from the string "this path and that" the natural language text string is transformed into the binary string "100001101001011" as follows:

| t | h | i | s | p | a | t | h | a | n | d | t | h | a | t |
|---|---|---|---|---|---|---|---|---|---|---|---|---|---|---|
| 1 | 0 | 0 | 0 | 0 | 1 | 1 | 0 | 1 | 0 | 0 | 1 | 0 | 1 | 1 |

In the above example phrase "this path and that," the letter "t" appears four times: in the first appearance, the letter "t" is at the beginning of the word "this", in the second appearance, the letter "t" is the third letter (and the second-to-last letter) of the word "path," in the third appearance, the letter "t" is the first letter of the word "that" and in the fourth appearance the letter "t" is the last letter of the word "that." In all four appearances of the letter 't', the result of transforming "t" in this particular 'letter-based natural language string transformation' is the same, irrespective of the position of the letter 't' within its 'host' word.

Similarly, in all three appearances within the example phrase "this path and that," the letter 'h' is transformed into '0' irrespective of its position within the host word. In particular, the letter 'h' appears three times—once as the second letter of "this," once as the fourth (and last) letter of "path," and once as the second letter of "that." In all three appearances, the letter 'h' is transformed into '0.'

The example of the previous two paragraphs referred to detections of occurrence locations of single-letter patterns. This feature of 'insensitivity' to position within the host word is not limited to single-letter patterns, and may also be provided when detecting locations of occurrences multi-letter patterns. The string "th" appears three times within the phrase 'this path and that'—a first time at the beginning of the word 'this,' a second time at the end of the word 'path,' and a third time at the beginning of the word 'that.' According to the example mapping discussed in the previous paragraphs and described in FIG. 8, for all three occurrences of the multi-letter pattern 'th,' the pattern 'th' is mapped to the same exact target, i.e. to the string '10.'

Some two-letter strings reside within a single host word. Some two-letter strings transcend host words, beginning within an earlier word and ending within a later word. For example, within the example phrase "this path and that," the multiple letter pattern "ha" appears twice—(i) the first appearance of "ha" begins with the last letter of the word "path" and ends with the first letter of the word "and"; (ii) the second appearance of "ha" is contained within the word "that." In both cases, irrespective of whether or not the multiple-letter pattern 'ha' is (i) contained within a single word (i.e. as in the second appearance of 'ha') or (ii) transcends words (i.e. as in the first appearance of 'ha'), the result of the 'letter-based natural language transformation' is the same.

DEFINITIONS

For convenience, in the context of the description herein, various terms are presented here. The current section is not intended as comprehensive and certain terms are discussed and/or defined elsewhere in the current disclosure. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

A 'length-significant portion of natural language text' is a portion of natural language text that includes at least 256 natural language letters and at least 10 natural language words. In some embodiments, the 'length-significant portion of natural language text' includes at least 512 or at least 1024 or at least 2048 letters and/or at most 2048 or at most 1024 or at most 512 letters.

A 'portion of natural language text' or a 'portion of a natural language text document' may refer either only a fraction (i.e. less than the entirety) or to the entirety of the 'natural language text' or 'natural language text document.'

Embodiments of the present invention relate to 'letter-based' locations within the natural language text as opposed to 'word-base' locations. For example, in the text "this path and that" the 'word-based' location of the word 'path' is "2" because "path" is the second word within the text. The 'letter-based' location of the last letter of the word path is "8" because this 'h' is the $8^{th}$ letter of the text. The 'letter-based' location of the last letter of the word 'this' is "4" because 's' is the $4^{th}$ letter of the text.

Within the text "this path and that", the letter-based position of the occurrence of the single-letter pattern "n" is "10." Within the text "this path and that", the letter-based position of the first occurrence of the multi-letter pattern "h immediately following a t" is '2.' Within the text "this path and that", the letter-based position of the second occurrence of the multi-letter pattern "h immediately following a t" is '8.' Within the text "this path and that", the letter-based position of the third occurrence of the multi-letter pattern "h immediately following a t" is '13.'

A 'natural language object' is either a letter, group of letters, word or group of words. In some examples, the detected single-letter or multi-letter pattern is a 'natural language object.' In the previous paragraph, it was noted that it is possible to determine a 'word-based' location or a 'letter-based' location within a portion of natural language text.

Similarly, there are a number of possible ways to measure distances between two natural language objects. One 'distance metric' is the number of intervening words. Within the following text "Four score and seven years ago, our fathers brought forth, upon this continent, a new nation, conceived in Liberty, and dedicated to the proposition that all men are created equal" (from the Abraham Lincoln's Gettysburg Address'), the 'word-based' distance between the words 'four' and 'fathers' is six words, because there are six intervening words {score, and, seven, years, ago, our}. The "letter-based distance" between the 'r' of the word four and the 'f' of fathers is 24, because there are 24 intervening letters between the 'r' of the word four and the 'f' of fathers (i.e. 5 letters of 'score,' 3 letters of 'and,' 5 letters of 'seven,' 5 letters of 'years,' 3 letters of 'ago,' 3 letters of 'our'—5+3+5+5+3+3=24).

In non-limiting embodiments, it is possible to employ a 'letter based' transformation (or mapping) when detecting locations of single-letter or multi-letter patterns within natural language text. A 'letter based' transformation (or mapping) refers to a transformation (or mapping) where individual letters are transformed on a per-letter basis—each letter is transformed into its own respective 'target.' Because the content of the 'target' depends on the identity of the 'source' natural language letter from which is mapped, it may be said that the target is 'source-letter-identity-dependent.' In the example presented above in the section entitled "One Non-Limiting Example "Letter-Based" Natural Language String Transformation," the 'target' to which letters 't' and 'a' is mapped is '1' (and the 'content' of this target is '1'), while the target to which all other natural language letters are mapped is '0' (and the 'content' of this target is '0').

In the example presented above in the section entitled "One Non-Limiting Example "Letter-Based" Natural Language String Transformation," all a's and t's were mapped to '1' and all other letters were mapped to '0.' In this example, the context of the letter mapped in the letter-mapping transformation is completely irrelevant.

In other examples, the context of a letter may play a role in how the letter is treated. Thus, in another example (see FIG. 6 and the discussion below), a source letter is mapped to a '1' if and only if (i) the source letter is a vowel; and (ii) the predecessor of the predecessor of the source letter is a vowel. Thus, in the word "steeper" the first two 'e's are mapped into a '0' while the last 'e' is mapped into a '1'—in this case, the context of a 'source' letter to be mapped plays a role.

For the present disclosure, a 'host word' of a letter is the word within which the letter appears. In the phrase "zebra in the breeze" the "host word" of the first 'z' is "zebra" and the 'host word' of the second 'z' is 'breeze.'

One salient feature provided by 'letter based transformations,' in some embodiments, is that the target to which a given natural language 'source' letter is mapped is substantially independent of the location of the 'source' letter within its host word. This may relate to detecting single-letter or multi-letter patterns in a manner that is independent of word-word boundaries.

Referring again to the example presented above in the section entitled "One Non-Limiting Example "Letter-Based" Natural Language String Transformation," a discussion was presented relating to the phrase "this path and that"—in that discussion, it was shown that the result of mapping a letter did not depend whatsoever on the location of any letter within its host word. Thus, in that example, the letter 't' appeared in different positions within a host word, and the resulting target to which T is transformed in the letter-based transformation is always the same. The embodiments of FIGS. 2-8 all provide the feature where every 'source' natural language letter is transformed or mapped into a respective target in a manner that does not depend upon source letter position within a host word.

Techniques described herein may be applied to text of any known natural language including but not limited to any number and/or combination and/or selection of: Indo-European languages (e.g. English, Greek, Germanic languages, Romance languages, Slavic languages, Indo-Iranian), Indo-Aryan languages (e.g. Iranian and Sanskrit) and Semitic languages (e.g. Arabic or Hebrew). Examples of Romance language include Spanish, Portuguese, French, Romanian and Italian. Examples of Slavic languages include Russian, Polish, Ukrainian, and Bulgarian. Examples of Germanic languages include German, Swedish, Danish and Norwegian.

A 'computer memory' (synonymous with 'computer storage') refers to any combination of volatile and/or non-volatile memory including but not limited to RAM, flash memory, ROM, magnetic storage, and optical medium.

The term 'electronic circuitry' or 'digital computer' is to interpreted broadly, and may refer to hardware (for example, including a microprocessor(s) and optionally volatile memory such as RAM or registers), firmware and/or software (for example, computer code which is stored in volatile and/or non-volatile memory and is executable by a microprocessor). Elements that may be included in 'electronic circuitry' or in a 'digital computer' include but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture.

A Discussion of FIG. 1

FIG. 1 is a flow chart of a routine for generating and comparing letter-based fingerprints of natural language text documents. In some embodiments, the routine of FIG. 1 may be used to detect plagiarism of one or more natural language text documents.

In steps S101A and S101B of FIG. 1, letter-based derivative data objects (i.e. describing letter-based locations of occurrences of single-letter or multi-letter patterns) are respectively generated for non-identical first and second natural-language text documents (or portions thereof). In one non-limiting example, this is accomplished by subjecting natural language letters of the natural-language text document to a 'letter-based' natural-language string-transformation. Non-limiting examples of the 'letter-based' natural-language string-transformations of step S101 are described below with reference to FIGS. 2-8.

In steps S105A and S105B, a pattern occurrence:letter position signal, derived according to the letter-based locations of occurrences of single-letter or multi-letter patterns, is analyzed. For example, it is possible to analyze, by digital computer, frequency domain representations of the pattern occurrence:letter position signal according to any appropriate routine e.g. discrete-cosine transformations (DCT) or fast-Fourier transformations (FFT)). In some embodiments, absolute or relative magnitudes of signal strength for a plurality of different frequencies are computed by digital computer.

In steps S107A and S107B, these signal strength magnitudes are stored for a plurality of frequencies. It is possible to generate the 'letter-based frequency' describing each portion of natural language text from the results of steps S105 and/or S107.

In some embodiments, it is possible to detect a level of (dis)similarity and/or an indication of a likelihood that one document is plagiarized from the other by comparing, in step S109, the frequency-domain representations or portions or descriptions thereof. For example, it is possible to compute a comparison between frequency-domain representations or portions or descriptions thereof which 'emphasize' or give 'greater weight to' and/or are based primarily upon and/or are based only upon signal strengths.

In one example, it is possible to compare, in step S109, signal strengths in a manner that gives more emphasis to 'lower' non-DC frequencies while de-emphasizing (or ignoring) power at higher frequencies.

In one particular implementation, only six 'low frequencies' are used in the comparison of step S109—similar values at these frequencies indicate an elevated likelihood that one of the documents (i.e. the first or second document) (or portion thereof) was copied from the other.

In some embodiments, as will be discussed below, the comparison of step S109 emphasizes trends of the power intensity as a function of frequency rather than absolute values of power intensity. In some embodiments, the comparison is only a coarse-grained comparison.

In non-limiting embodiments, this process of FIG. 1 may be repeated a number of times for overlapping or non-overlapping of windows of text within a larger body of natural language text. For example, it is possible to set up some sort of 'sliding window' which allows for iterative calculation of fingerprints at different locations within the natural language document.

Instead of only comparing a single 'window' of text, it is possible to compare multiple windows.

The results of the comparison of step S109 may be used for any purpose, for example, for protecting one of the documents (or a portion(s) thereof) against piracy. In some embodiments, step S111 is carried out if the comparison of step S109 indicates similarity between the two documents; step S115 is carried out if the comparison of step S109 does not indicate similarity (or indicates a 'lesser' degree of similarity) between the two documents of portions thereof. Examples relating to steps S111 and S115 are described below in the section entitled 'example implementations of steps S111 and S115').

FIGS. 2A, 3A, 4A, 5A, 6A, 7A and 8 are all flow charts describing different respective implementations of step S101 and thus relate to identifying locations of single-letter or multi-letter patterns within natural language text.

A Discussion of FIGS. 2-8

As noted above, in some embodiments, it is possible to detect the single-letter or multi-letter patterns by subjecting each natural language letter of a text portion to a letter-based transformation where each letter is mapped or transformed to a different target.

Each of FIGS. 2A, 3A, 4A, 5A, 6A, 7A and 8 describe, according to non-limiting examples, various routines for detecting letter-based locations of occurrences of single-letter or multi-letter patterns within a portion of natural language text. In the examples of FIGS. 2A, 3A, 4A, 5A, 6A, 7A and 8, the detecting is carried out by subjecting each natural language letter of a text portion to a letter-based transformation, or mapping, where each letter is mapped or transformed to a different target.

FIGS. 2B, 3B, 4B, 5B, 6B, and 7B respectively describe the pattern-occurrence:letter position signal generated from a 50-letter-long sample portion of natural language text according to routines of FIGS. 2A, 3A, 4A, 5A, 6A, and 7A.

As may be observed graphically from FIGS. 2B, 3B, 4B, 5B, and 6B, in some embodiments the pattern-occurrence: letter position signal is substantially only a two-level signal. As may be observed graphically FIG. 7B, in some embodiments the pattern-occurrence:letter position signal is substantially only a three-level signal.

The input for the routines of FIGS. 2A, 3A, 4A, 5A, 6A, 7A and 8 is natural language text—for example, a 'length-significant' portion of natural language text. The 'derivative data object' output for the routines of FIGS. 2A, 3A, 4A, 5A, 6A is a binary sequence (i.e. 1's and 0's—thus the 'alphabet size' of possible 'targets' to which 'source' natural language letters may be transformed or mapped is equal to 2) whose length is equal to the length of the input natural language text after removal of punctuation and white-space. The 'derivative data object' output for the routines of FIG. 7A is a sequence of characters of an alphabet whose size is 3 (i.e. a sequence of 0's and 1's and 2's—thus the 'alphabet size' is equal to 3) whose length is equal to the length of the input natural language text after removal of punctuation and white-space.

FIGS. 2A, 3A, 4A, 5A, 6A and 7A respectively describe different pattern identification techniques and/or different text transformation techniques where a derivative data object is generated from natural language text (for example the text of Annex A). In step S201 of FIGS. 2A, 3A, 4A, 5A, 6A and 7A, all white-space and punctuation is removed from the natural language text and all upper case letters are transformed to lower case. The output of step S201 is a string STR=concat(S[1]S[2] . . . S[N]) of length N where N is a positive integer. Each S[i] (i is a positive integer less than N) is a single letter of the 'natural language alphabet'—'concat' denotes concatenation.

A portion of the string STR=concat(S[1]S[2] . . . S[N]) or the entirety of string SIR is the input of steps S215 of FIG. 2A, S225 of FIG. 3A, S235 of FIG. 4A, S245 of FIG. 5A, S255 of FIG. 6A, and S265 of FIG. 7A.

More specifically, in steps S215 of FIG. 2A, S225 of FIG. 3A, S235 of FIG. 4A, S245 of FIG. 5A, S255 of FIG. 6A, and S265 of FIG. 7A, it is possible to derive from a sub-string SUB=concat(S[j]S[j+1] . . . S[k]) of string SIR a derivative data object DDO=concat(D[j]D[j+1] . . . D[k]. Both j and k are positive integers having values greater than or equal to 1 and less than or equal to N. The positive integer k has a greater value than the positive integer j, and the length of both sub-string SUB and DDO (derivative data object) is equal to one plus the difference between k and j.

In various examples, the frequency domain representation of this derivative data object DDO (i.e. which is computed in S215 of FIG. 2A, S225 of FIG. 3A, S235 of FIG. 4A, S245 of FIG. 5A, S255 of FIG. 6A, and S265 of FIG. 7A) is computed in step S105 of FIG. 1.

Figure 2B:
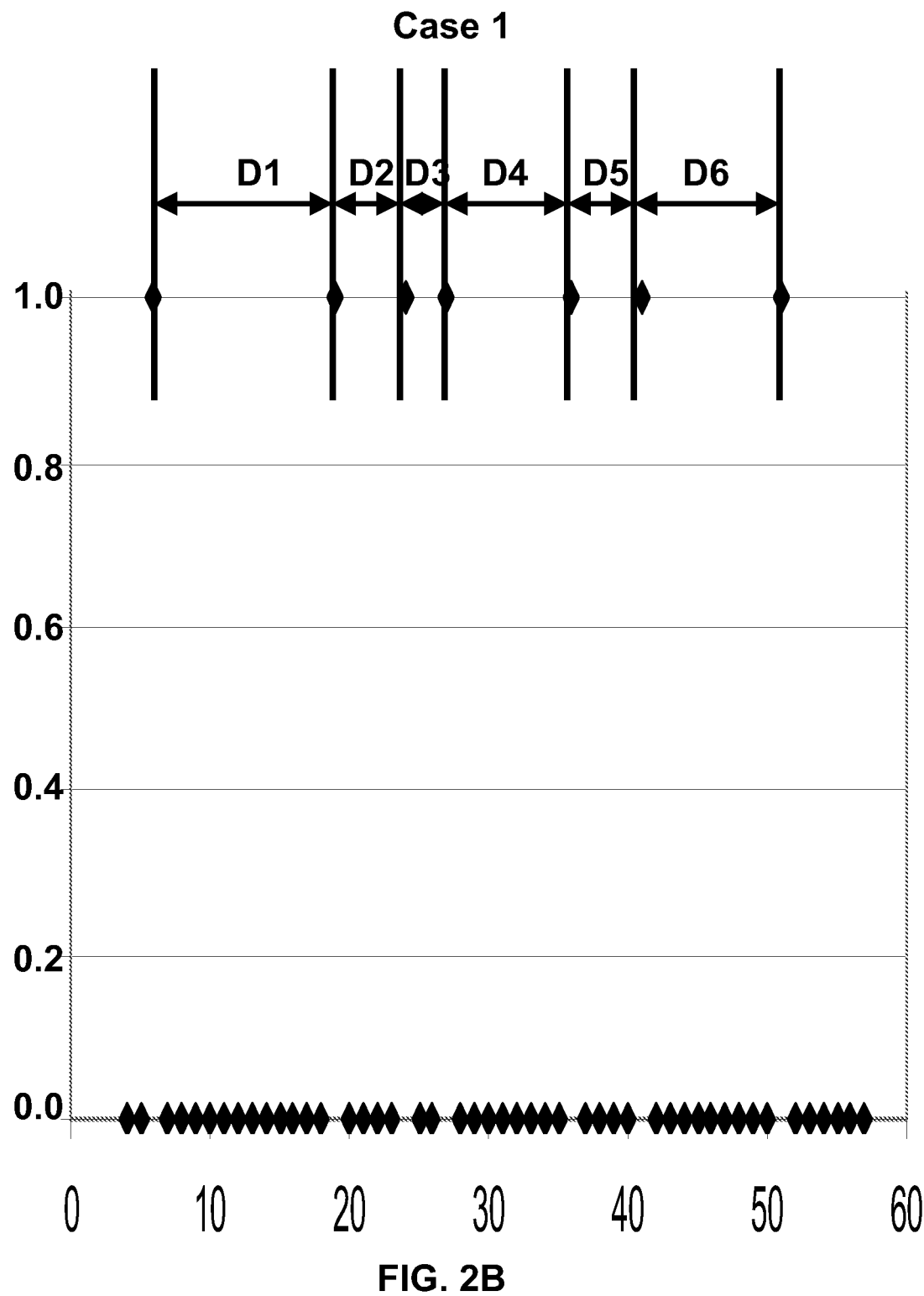
Figure 3B:
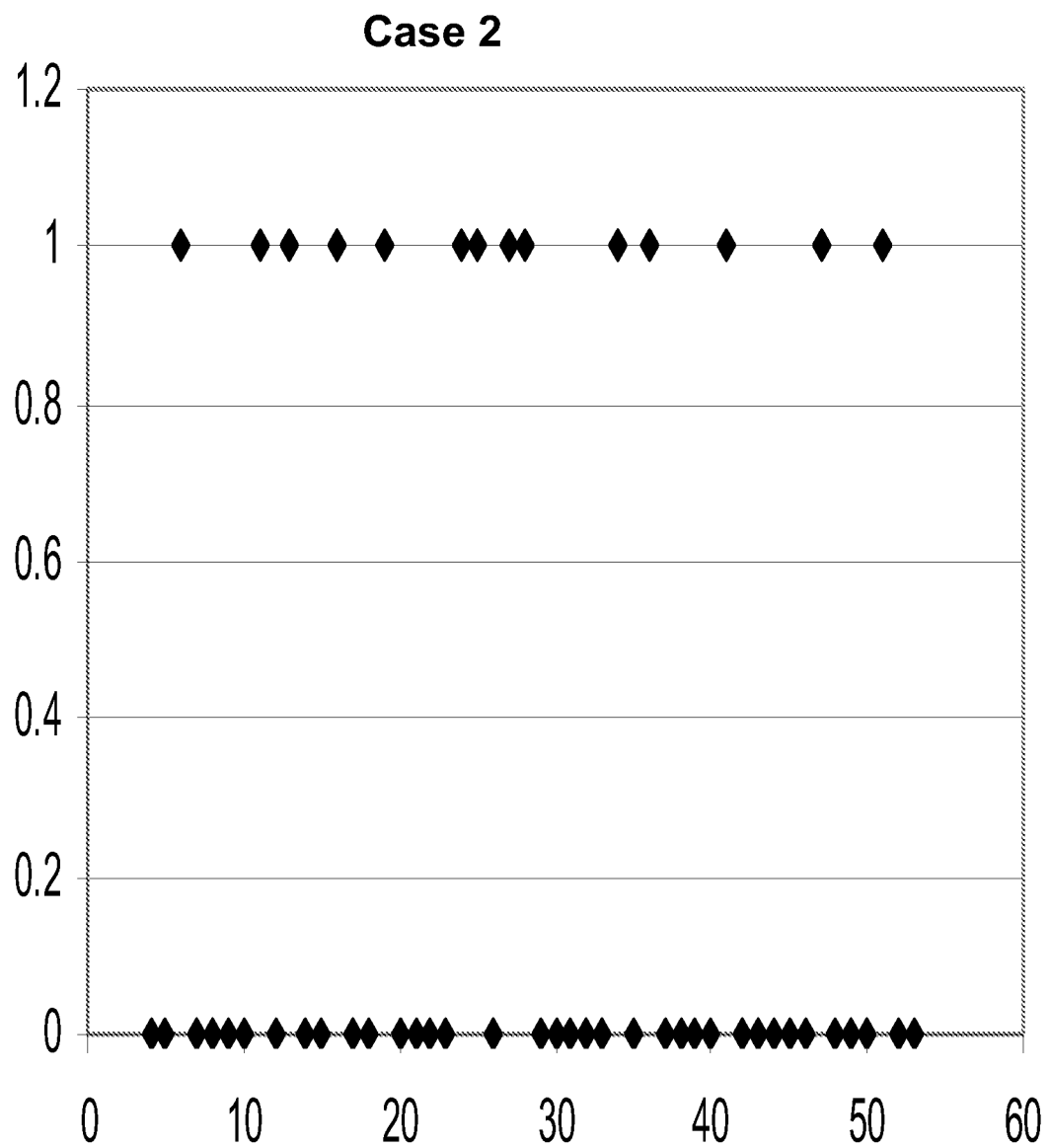
Figure 4B:
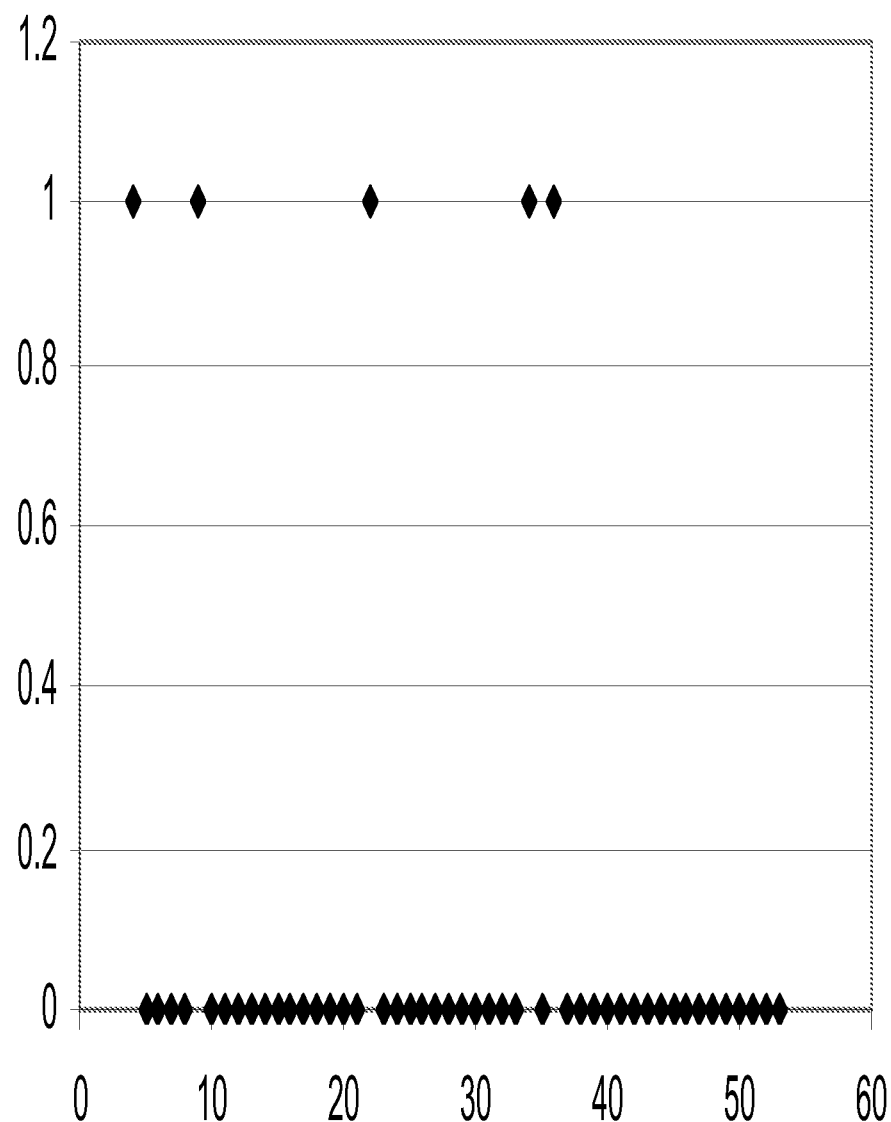
Figure 5B:
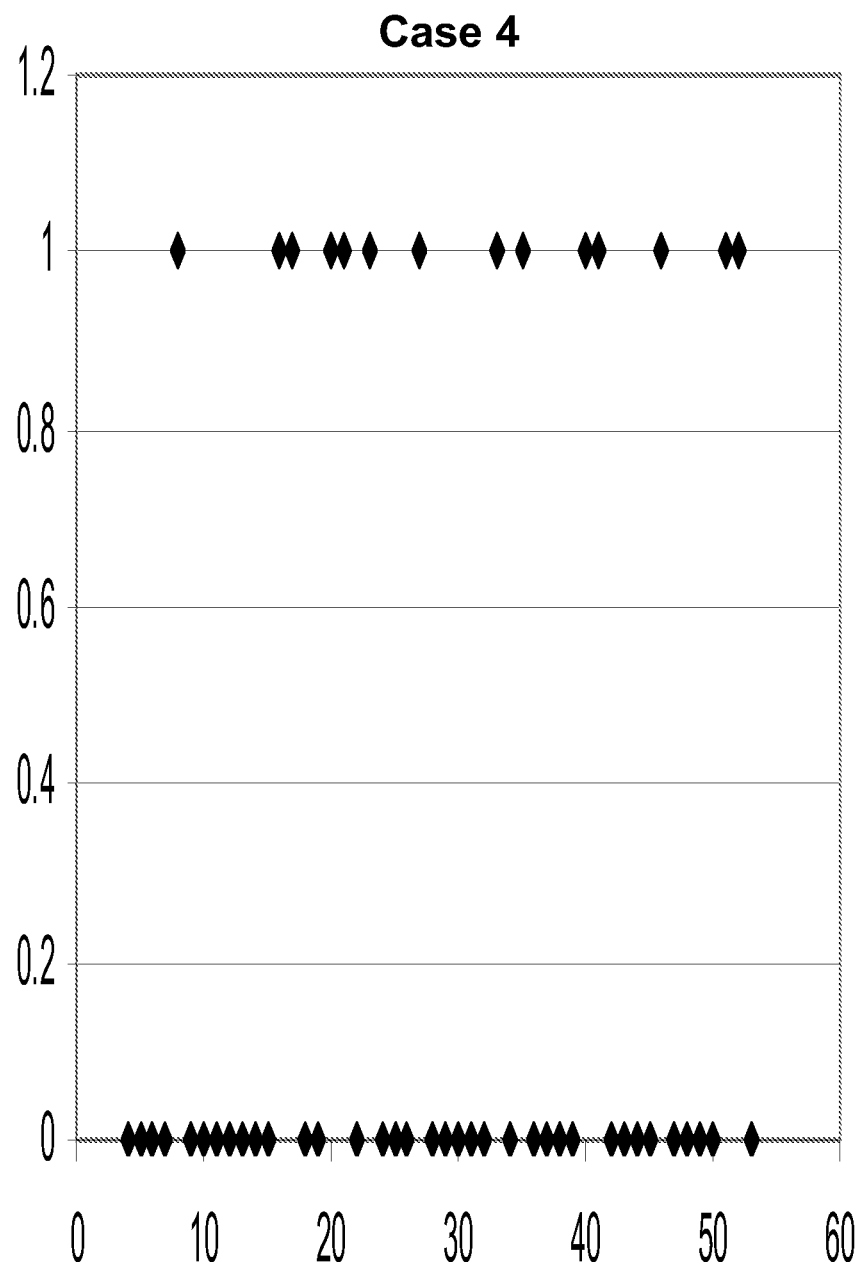
Figure 6B:
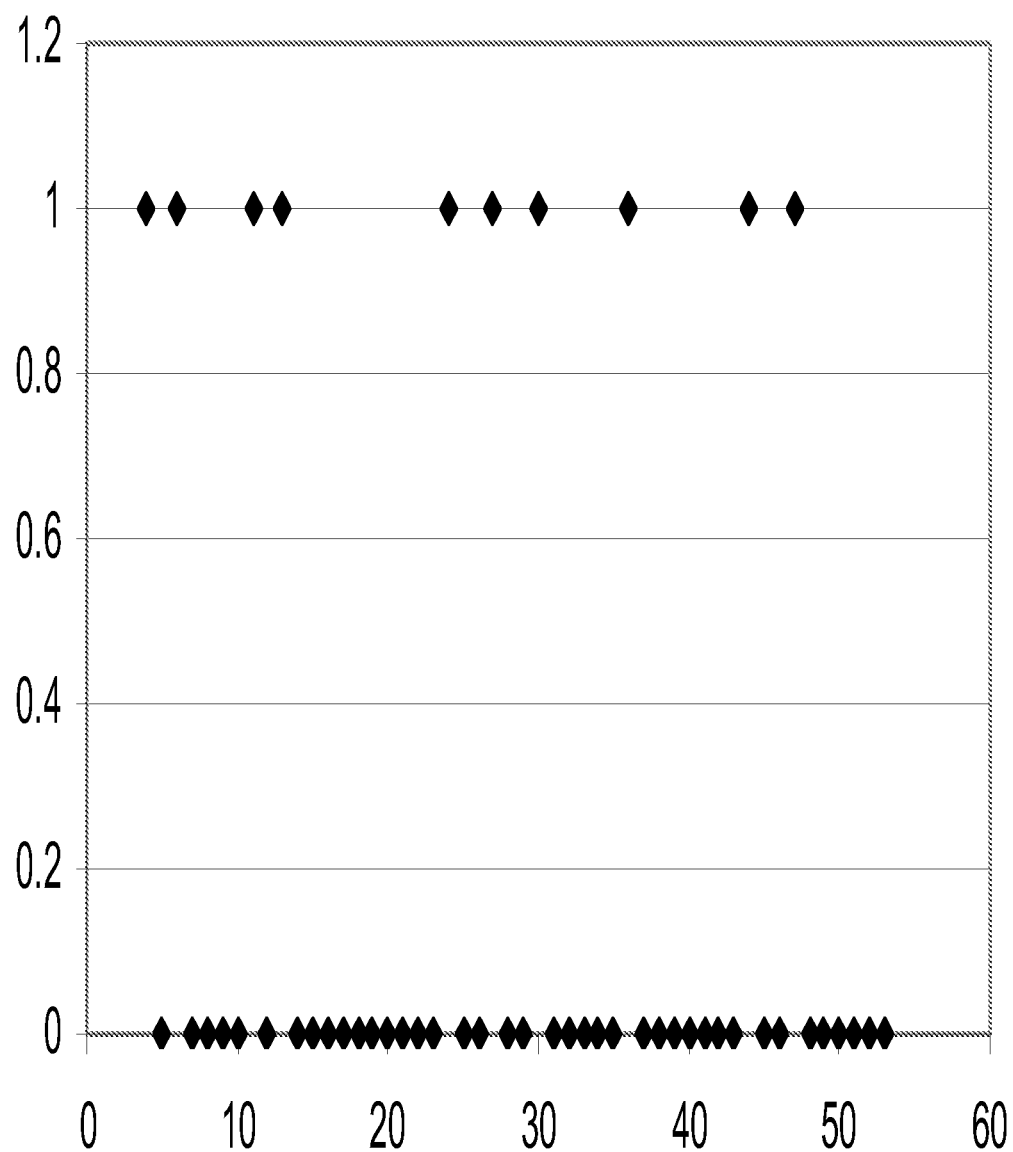
Figure 7B:
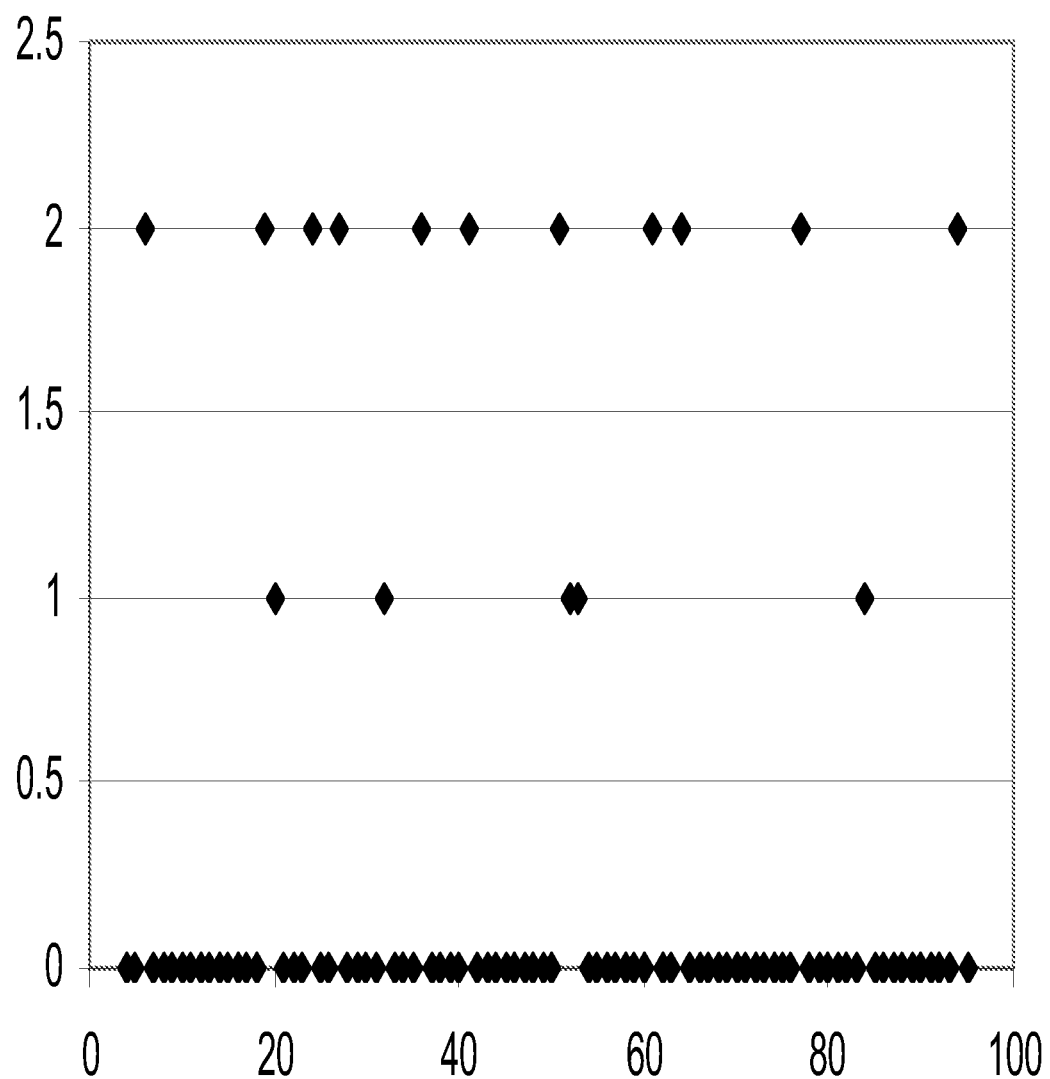

In the examples of steps S215 of FIG. 2A, S225 of FIG. 3A, S235 of FIG. 4A, S245 of FIG. 5A, S255 of FIG. 6A, and S265 of FIG. 7A, each letter S[i] (i is a positive integer between j and k) of SUB is respectively transformed to a letter D[i] of DDO (derivative data object). Each letter S[i] is taken from a natural language alphabet while each letter D[i] is taken from a 'target alphabet'—in the examples of FIGS. 2A, 3A, 4A, 5A and 6A, the size of the target alphabet is exactly two (i.e. corresponding to the two-level pattern-occurrence: letter position signal observed in FIGS. 2B, 3B, 4B, 5B and 6B), while in the example of FIG. 7A, the size of the target alphabet is exactly three (i.e. corresponding to the two-level pattern-occurrence:letter position signal observed in FIG. 7B).

The routines of FIGS. 2-8 (and the pattern-occurrence: letter position signal graphically illustrated in FIGS. 2B, 3B, 4B, 5B, 6B and 7B) may be explained with respect to a sample text section, taken from the beginning of the text of Annex A. This sample text section is reproduced below:

President Obama Changes Tone Ahead of State of the Union Address

But GOP Leader Mitch McConnell Calls for a Change of Course

On the eve of President Obama's State of the Union address and the end of his first year in office, Republican Scott Brown's astonishing win in the Massachusetts special Senate race not only reset politics in that state, but reset politics for the entire nation.

President will respond to Democratic losses, economy and health care."The entire political community was caught a little bit unawares on that one," White House senior adviser David Axelrod Removing white space and punctuation from the sample text reproduced above, in step S201 of FIGS. 2A, 3A, 4A, 5A, 6A and 7A, yields the following output string SIR:

presidentobamachangestonea-
    headofstateoftheunionaddressbutgoplea dermitchmc-
    connellcallsforachangeof-
    courseontheeveofpresidentobam
    asstateoftheunionaddres-
    sandtheendofhisfirstyearinofficerepublicansc ottbrown-
    sastonishingwininthemassa-
    chusettsspecialsenateracenotonlyr
    esetpoliticsinthatstatebutre-
    setpoliticsfortheentirenationpresidentwill respondto-
    democraticlosseseconomyand-
    healthcaretheentirepoliticalco
    mmunitywascaughtalittlebi-
    tunawaresonthatonewhitehouseseniorad vis erdavidax-
    elrods In this example, S[1]='p', S[2]='r', S[3]='e', and so on.

Steps S215 of FIG. 2A, S225 of FIG. 3A, S235 of FIG. 4A, S245 of FIG. 5A, S255 of FIG. 6A, and S265 of FIG. 7A may be explained with respect to the underlined section of string STR:

pres
    identobamachangestoneaheadofstateoftheunionaddress
    butgoplea dermitchmcconnellcallsfo-
    rachangeofcourseontheeveofpresidentobam
    asstateoftheunionaddres-
    sandtheendofhisfirstyearinofficerepublicansc ottbrown-
    sastonishingwininthemassa-
    chusettsspecialsenateracenotonlyr
    esetpoliticsinthatstatebutre-
    setpoliticsfortheentirenationpresidentwill respondto-
    democraticlosseseconomyand-
    healthcaretheentirepoliticalco
    mmunitywascaughtalittlebi-
    tunawaresonthatonewhitehouseseniorad vis erdavidax-
    elrods This underlined section is the substring SUB of string SIR.

Thus, in this example, the string SUB=identobamachangestoneaheadofstateoftheunionaddress (referred to as 'the example SUB'). In this example, j=5 (since the first letter of SUB='i' is the fifth letter of SIR) while k=55 (since the last letter of SUB='s' is the 54$^{th}$ letter of SIR). In this example, the length of SUB, is equal to k−j+1=50.

According to step S215 of FIG. 2B, every letter that is an 'e' is transformed into a '1' while every letter that is not an 'e' is transformed into a '0.' Applying step S215 to the 'example SUB' identobamachangestoneaheadofstateoftheunionaddressb thus yields the 'example derivative data object (or the 'example DDO (derivative data object)') of the routine of FIG. 2B' DDO='001000 0000000001000010010000000010000100000000100'

Lining up SUB and DDO (derivative data object) for this example where DDO was generated by step S215 of FIG. 2A yields:

identobamachangestoneaheadofstateoftheunionaddress
0010000000000001000010010000000010000100000000100
5    0    5    0    5    0    5    0    5    0

All 'letters' of DDO (derivative data object) of the above example are '0' except for the following letters which are equal to '1': {D[7] which is the $3^{rd}$ letter of DDO, D[20] which is the $16^{th}$ letter of DDO, D[25] which is the $22^{nd}$ letter of DDO, D[28] which is the $25^{th}$ letter of DDO, D[37] which is the $34^{th}$ letter of DDO, D[42] which is the $39^{th}$ letter of DDO, and D[52] which is the $49^{th}$ letter of DDO.

Thus, it is possible to represent DDO (derivative data object) by the position of the letters of SIR that are '1' and not '0' or {7,20,25,28,37,42,52}. A total of seven letters of DDO are '1' and not '0.'

It is noted that the list of letter-based locations {7,20,25, 28,37,42,52} describing locations in the natural language text of occurrences of the pattern (in this case, the single-letter 'e' pattern) may also be used to represent signal of FIG. 2B.

FIG. 2B illustrates the values of DDO (derivative data object) as a function of position within SIR for the routine of FIG. 2A as applied to the 'example SUB' identobamachangestoneaheadofstateoftheunionaddressb. The 'distances' between subsequent appearances of '1's for the example SUB (i.e. the number of intervening 0's between consecutive 1's) are graphically illustrated in FIG. 2B—these distances relate to a 'letter-based distance metric' between appearances of 'e' within the natural language text that is transformed in the routine of FIG. 2A. There are a total of six distances {D1,D2, D3,D4,D5 and D6} and their values are {12,4,7,8,4,9}.

It is noted that the list of letter-based distances {12,4,7,8, 4,9} describing locations in the natural language text of occurrences of the pattern (in this case, the single-letter 'e' pattern) may also be used to represent aspects of the signal of FIG. 2B—for example, aspects relevant to the frequency-domain representation.

Thus, there are 12 0's between the first and second 1 of DDO, there are 4 0's between the second and third 1 of DDO, and so on. This distance also corresponds to the number of intervening natural language letters of SUB that are mapped to '0' between letters that are mapped to '1.'

It is noted that the frequency domain representation of DDO (derivative data object) computed in step S105 of FIG. 1 is derived from these distances between 1's which describes distances between "e's" in the natural language text.

Referring now to FIG. 3A, it is noted that in the example of FIG. 3A, individual natural language letters of the string SUB are mapped to individual 'target' symbols (e.g. of a 'small alphabet'—in the case of FIG. 3B, a binary alphabet) according to the following mapping: every 'e' is mapped to a '1,' every 'a' is mapped to a '1' and every letter other than 'e' and 'a' is mapped to a 0.

Lining up SUB and DDO (derivative data object) for this example where DDO was generated by step S225 of FIG. 3A yields:

identobamachangestoneaheadofstateoftheunionaddress
0010000101001001000011011000001010000100001000100
5    0    5    0    5    0    5    0    5    0

FIG. 3B illustrates the values of DDO (derivative data object) as a function of position within SIR for the routine of FIG. 3A as applied to the 'example SUB' identobamachangestoneaheadofstateoftheunionaddressb.

Comparing the routines of FIGS. 2A and 3A, it is noted that the English language frequency of the letter 'e' is about 12.5% and the English language frequency of the letter 'a' is 8%. Thus, in the example of FIG. 2A, a majority of about 88% of the letters are 0 while a minority of around 12% of the letters are '0'—the ratio between 1's and 0's is around 7. In the example of FIG. 3A, a majority of about 80% of the letters are 1 and a minority of the around 20% of the letters are 0—the ratio between 1's and 0's is around 4.

Referring now to FIG. 4A, it is noted that in the example of FIG. 4A, individual natural language letters of the string SUB are mapped to individual symbols (e.g. of a 'small alphabet'—in the case of FIG. 4B, a binary alphabet) according to the following mapping: every letter S[i] is mapped to a '1,' if and only if (i) its immediate predecessor letter S[i-1] is an 's' or a 't' and (ii) the letter Ski itself is a vowel (i.e. equal to 'a' or 'e' or 'i' or 'o' or 'u'). In the example of FIG. 4A, every letter not mapped to a '1' is mapped to a '0.'

Lining up SUB and DDO for this example where DDO was generated by step S235 of FIG. 4A yields:

identobamachangestoneaheadofstateoftheunionaddress
1000010000000000001000000000001010000000000000000
5    0    5    0    5    0    5    0    5    0

FIG. 4B illustrates the values of DDO as a function of position within SIR for the routine of FIG. 4A as applied to the 'example SUB' identobamachangestoneaheadofstateoftheunionaddressb.

One difference between the routines of FIGS. 2-3 and the routine of FIG. 4 is that in the routines of FIGS. 2-3, the 'mapping result' D[i] of natural language letter S[i] of the natural language string SIR (i.e. after removing punctuation and white space) depends only on S[i]. In contrast, in the routine of FIG. 4, the 'mapping result' D[i] of natural language letter S[i] of the natural language string STR (i.e. after removing punctuation and white space) depends both upon Ski as well as a neighboring letter (in this case S[i-1]). In the example of FIG. 4, this letter is an 'immediate neighbor.' As will be discussed below with reference to FIG. 6, in some examples this neighbor can be a letter in the 'same neighborhood' but not necessarily an immediate neighbor.

Referring now to FIG. 5A, it is noted that in the example of FIG. 5A, individual natural language letters of the string SUB are mapped to individual symbols (e.g. of a 'small alphabet'—in the case of FIG. 5, a binary alphabet) according to the following mapping: every letter S[i] is mapped to a '1,' if and only if the concatenation of the letter's immediate predecessor S[i-1] within the natural language string SIR and the letter itself S[i] (i.e. concat(S[i-1],S[i])) is one of the 13 most common bigrams. All other letters are mapped to '0.' For example, if concat(S[i-1],S[i]) is one of the 13 most common bigrams but concat(S[i-2],S[i-1]) is not one of the 13 most common bigrams, then S[i] is mapped to '1' while S[i-1] is not mapped to '1.'

According to Wikipedia, the 13 most common bigrams in the English language are {th,he,in,er,an,re,nd,at,on,nt,ha,es,st}.

Lining up SUB and DDO (derivative data object) for this example where DDO was generated by step S245 of FIG. 5A yields:

```
identobamachangestoneaheadofstateoftheunionaddress
00001000000011001101000100000101000011000010000110
 5   0   5   0   5   0   5   0   5   0
```

FIG. 5B illustrates the values of DDO as a function of position within SIR for the routine of FIG. 5A as applied to the 'example SUB' identobamachangestoneaheadofstateoftheunionaddressb.

FIG. 6 illustrates a 'letter-based natural language transformation routine' whereby letters are not considered in the context their immediate predecessor (see FIG. 4, where the content predecessor letter S[i-1] influences the result of mapping letter S[i]), but in the context of the predecessor of the letter's immediate predecessor (S[i-2]). In the word "path," the predecessor to the immediate predecessor of the letter "t" is the letter "p."

Thus, in the example of FIG. 6A, a natural language letter S[i] is mapped to 1 if and only if: (i) the letter S[i] is a vowel; and (ii) S[i-2] (i.e. the predecessor of the letter's immediate predecessor) is also a vowel.

FIG. 6B illustrates the values of DDO (derivative data object) as a function of position within SIR for the routine of FIG. 6A as applied to the 'example SUB' identobamachangestoneaheadofstateoftheunionaddressb.

Referring now to FIG. 7A, it is noted that in the example of FIG. 7A, individual natural language letters of the string SUB are mapped to individual symbols (e.g. of a 'small alphabet'—in the case of FIG. 3B, a ternary alphabet) according to the following mapping: every 'e' is mapped to a '2,' every 's' is mapped to a '1' and every letter other than 'e' and 's' is mapped to a 0.

Lining up SUB and DDO for this example where DDO was generated by step S265 of FIG. 7A yields:

```
identobamachangestoneaheadofstateoftheunionaddress
00200000000000021000200200001000200002000000000211
 5   0   5   0   5   0   5   0   5   0
```

FIG. 7B illustrates the values of DDO (derivative data object) as a function of position within SIR for the routine of FIG. 7A as applied to the 'example SUB' identobamachangestoneaheadofstateoftheunionaddressb.

Figure 9B:
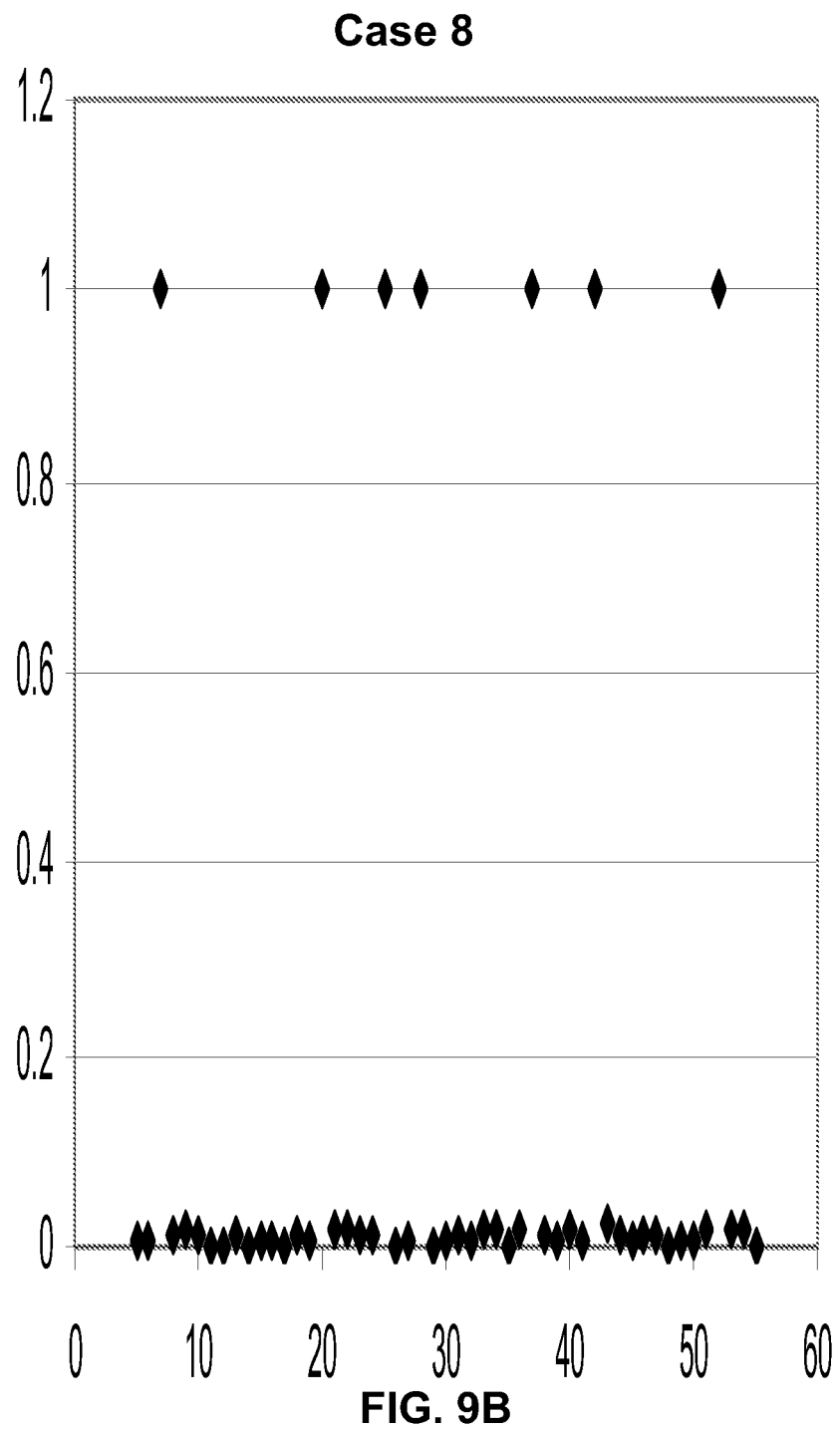
Figure 10B:
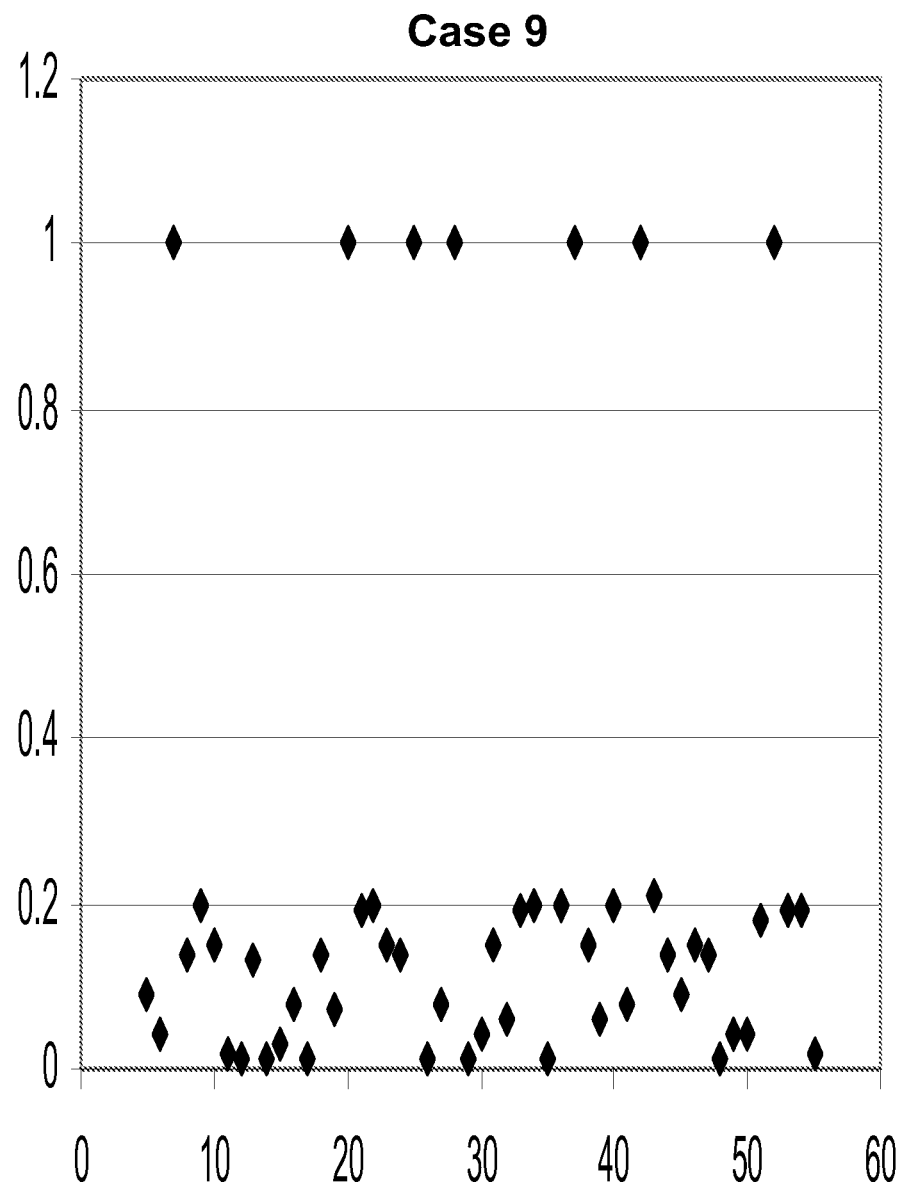

FIGS. 8 (i.e. including step S275), 9A (i.e. including step S295) and 9B (i.e. including step S297) are all flow charts for routines for detecting letter patterns in order to generate a signal. FIG. 9B illustrates a signal generated by the routine of FIG. 9A; FIG. 10B illustrates a signal generated by the routine of FIG. 10A.

A Discussion of Signals that are Substantially 2-Level and 3-Level Signals

The examples of FIGS. 2B, 3B, 4B, 5B, 6B and 7B relate to 2-level and 3-level level pattern-occurrence:letter position signals. The signals of FIGS. 2B-6B are exactly 2-level signals—every letter was assigned to one of two values. The signals of FIG. 7B is exactly a 3-level signal—every letter was assigned to one of three values VAL1, VAL2 and VAL3 (in FIG. 7B, VAL1=0, VAL2=1 and VAL3=2) and one of the values (i.e. VAL2) is equidistant from the other two values (i.e. |VAL3−VAL2|=|VAL2−VAL1|).

Some embodiments relate to generation of a fingerprint of a natural language text section by (i) generating a 2-level or 3-level signal according to textual pattern within the natural language text and (ii) subjecting this signal to a frequency analysis to signal strength magnitudes at lower frequencies. This fingerprint may be used to detect plagiarism.

In some examples (see FIGS. 9B and 10B), a substantially 2-level or substantially 3-level signal may be generated.

For the present disclosure, a signal is 'substantially two-level' over portion of natural language text, if the signal value, for a majority of (or a significant majority that is at least 75% of the letters of the natural language text portion or a very significant majority that is at least 90% of the letters of the natural language text portion or a substantially all letters—i.e. at least 95% of the letters of the natural language text portion) the signal is equal to one of two values (i.e. either VAL1 or VAL2) within a tolerance that is at most 30% or at most 20% or at most 10% or at most 5% the difference between the two values |VAL2−VAL1|. Examples of 'substantially two-level signals are shown in FIGS. 9B and 10B. In this case, the difference between the two values |VAL2−VAL1| is referred to as an 'adjacent level difference value' of the two levels.

For the present disclosure, a signal is 'substantially three-level' over portion of natural language text, if the signal value, for a majority of (or a significant majority that is at least 75% of the letters of the natural language text portion or a very significant majority that is at least 90% of the letters of the natural language text portion or a substantially all letters—i.e. at least 95% of the letters of the natural language text portion) the signal is substantially equal to one of three values VAL1, VAL2, VAL3 (VAL3>VAL2>VAL1) where an 'adjacent level difference value' between VAL1 and VAL2 (i.e. equal to |VAL2−VAL1|) is equal to an 'adjacent level difference value' between VAL3 and VAL2 (i.e. equal to |VAL3−VAL2|)—i.e. |VAL3−VAL2|=|VAL2−VAL1|)—this is referred to as the 'adjacent level difference value' of the three levels. 'Substantially equal to' is defined as 'equal to' within a tolerance that is at most 30% or at most 20% or at most 10% or at most 5% an 'adjacent level difference value.'

In some embodiments, it has been observed that despite the fact that 2-level or 3-level pattern-occurrence:letter position signals (or 'substantially 2-level or 3-level after 'rounding') may only include a fraction of the information of the 'information-rich' natural language text, the signals can still serve as a basis for a meaningful natural language text fingerprint (i.e. after computing the frequency domain representation) for detecting plagiarism.

Two-Level or Substantially Two-Level Signals That Have 'Asymmetric Occurrence Profiles'

Observation of FIGS. 2C-6C indicates that even though the signals are two level signals, the occurrence frequency of '0' is not equal to the occurrence frequency of '1'—instead, most values are '0's and the occurrence frequency of '1' is between about 5% and 30%.

Some embodiments relate to analyzing textual patterns within a portion of natural language text to produce a substantially two-level signal such that: (i) for a first fraction of the letters of the natural language text portion that is at least 5% or least 10% and/or at most 30% or at most 25% of the letters of the natural language text portion, a signal value is 'substantially' (see the tolerances above—i.e. most 30% or at most 20% or at most 10% or at most 5% of the 'adjacent level difference value') equal to a first level of the two levels (in FIGS. 2B-6B and 9B-10B the value of this 'first level' is '1'); and (ii) for a second fraction of the letters of the natural language text portion, a signal value is 'substantially' (see the tolerances above—i.e. most 30% or at most 20% or at most 10% or at most 5% of the 'adjacent level difference value') equal to a second level of the two levels (in FIGS. 2B-6B and 9B-10B the value of this 'second level' is '0').

In some embodiments, a ratio between the second and first fractions is at least 2:1 or at least 3:1 and/or a sum of the first and second fractions are at least 50% or at least 75% or at least 90%.

Figure 11:
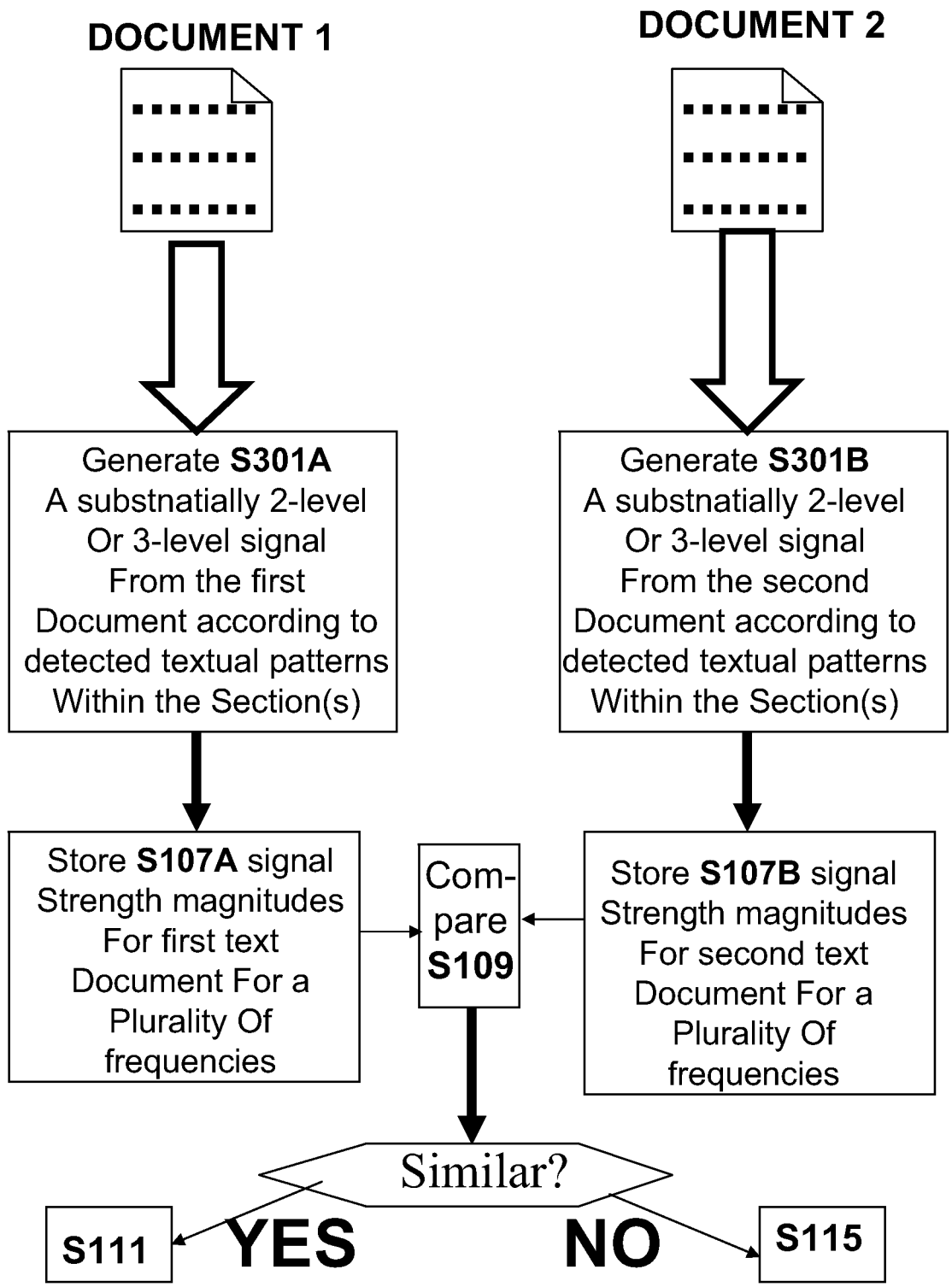

A Discussion of FIG. 11

FIG. 11 is a flow chart of a routine for (i) generating a substantially 2 or 3-level signal from letter patterns in a natural language text portion in step S301; and (ii) storing computed (e.g. by FFT or DCT or DFT or DST) frequency-dependent signal magnitude values in step S107 for a plurality of frequencies (e.g. including several consecutive 'low-frequencies' including the lowest non-DC frequency).

A Discussion of Apparatus for Carrying Out any Routine Disclosed Herein

Any routine disclosed herein may be carried out by any combination of hardware and/or software in any combination of location(s) (e.g. within a single device or multi devices in communications via a local or remote communications network).

Figure 12:
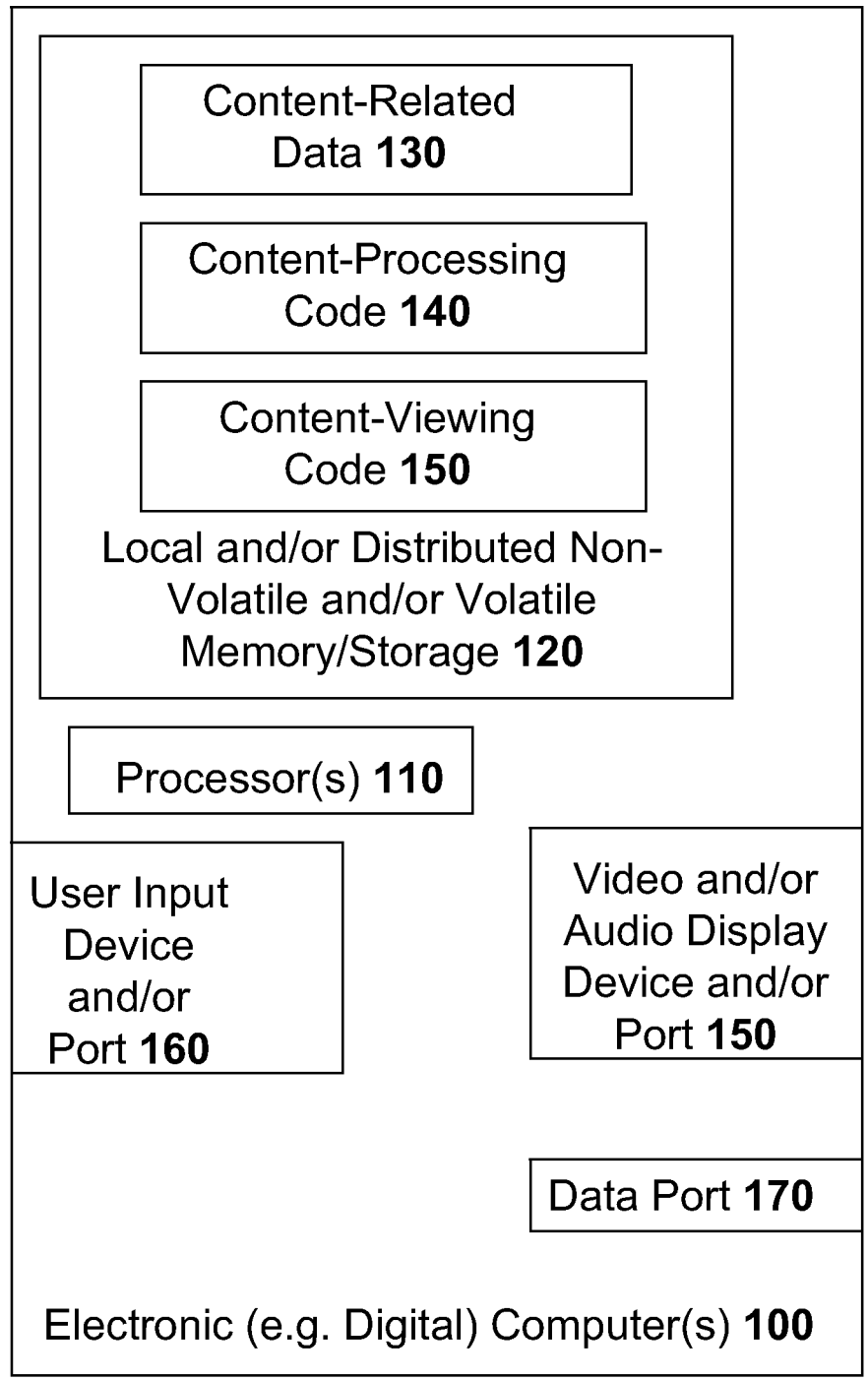
FIG. 12 illustrates a digital computer.

FIG. 12 describes an electronic (e.g. digital) computer(s). FIG. 12 may refer to a single device or to a plurality of devices in communication with each other. It is appreciated that other elements not illustrated in FIG. 12 may be provided, not every embodiment requires every element illustrated in FIG. 12.

In the non-limiting example of FIG. 12, the digital computer(s) 100 includes one or more processor(s) 110 (e.g. microprocessor) configured to execute computer-readable code that resides in volatile and/or non-volatile memory and/or storage 120. Code modules illustrated in the non-limiting example of FIG. 12 include content-processing code 130 (i.e. for processing content-related data 130 such as data object representations of natural language text or derivative(s) thereof) and content-viewing code 150. In some embodiments, execution of content-processing code 130 by processor(s) 110 is operative to carry out any routine disclosed herein, or any portion thereof.

Digital computer(s) may also include a user input device (e.g. mouse or joystick or keyboard or touch screen) and/or port (e.g. USB port) 160, a video and/or audio display device (e.g. screen or speaker) and/or port 150, and a data port 170 (e.g. a USB port, an Ethernet port or any other data port).

In some embodiments, content-viewing code 150 is operative to display, on a display screen, natural language text content (e.g. text content of the length-significant portion discussed with reference to various examples routines disclosed herein).

Examples of such 'digital computers' include, but are not limited to, rack-mounted servers or any other 'server' machine, laptop devices, table devices, desktop devices and eBook readers.

Figure 13:
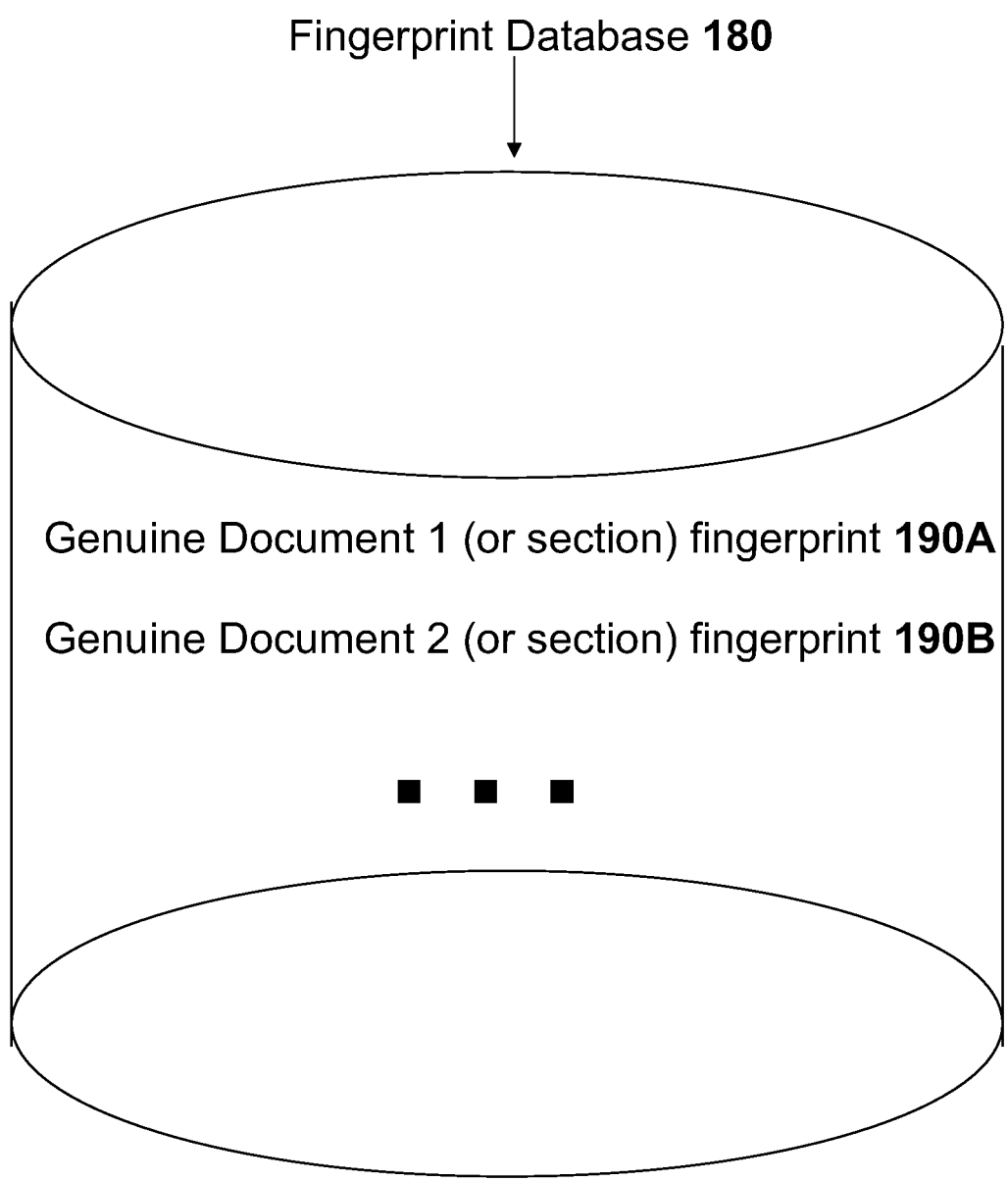
FIG. 13 illustrates a fingerprint database.

A Brief Description of FIG. 13

In some embodiments, it may be useful to maintain in volatile and/or non-volatile computer memory and/or storage (e.g. of a 'fingerprint database 180), data objects 190 describing fingerprints of 'genuine documents.' In one example related to eBooks, there may be a list of documents on a 'piracy watch list.' In this example, 'candidate content' which may or may not be plagiarized is compared only with fingerprints of the document list and/or compared in an order determined with the likelihood that certain 'genuine' documents are pirated.

In one example related to a 'candidate' news article, a letter-based fingerprint of the 'candidate news article (which may or may not be pirated) is first compared with fingerprints of more recent 'genuine news articles' (i.e. of a rights-holder) and only later is compared with 'older' news content.

Figure 14:
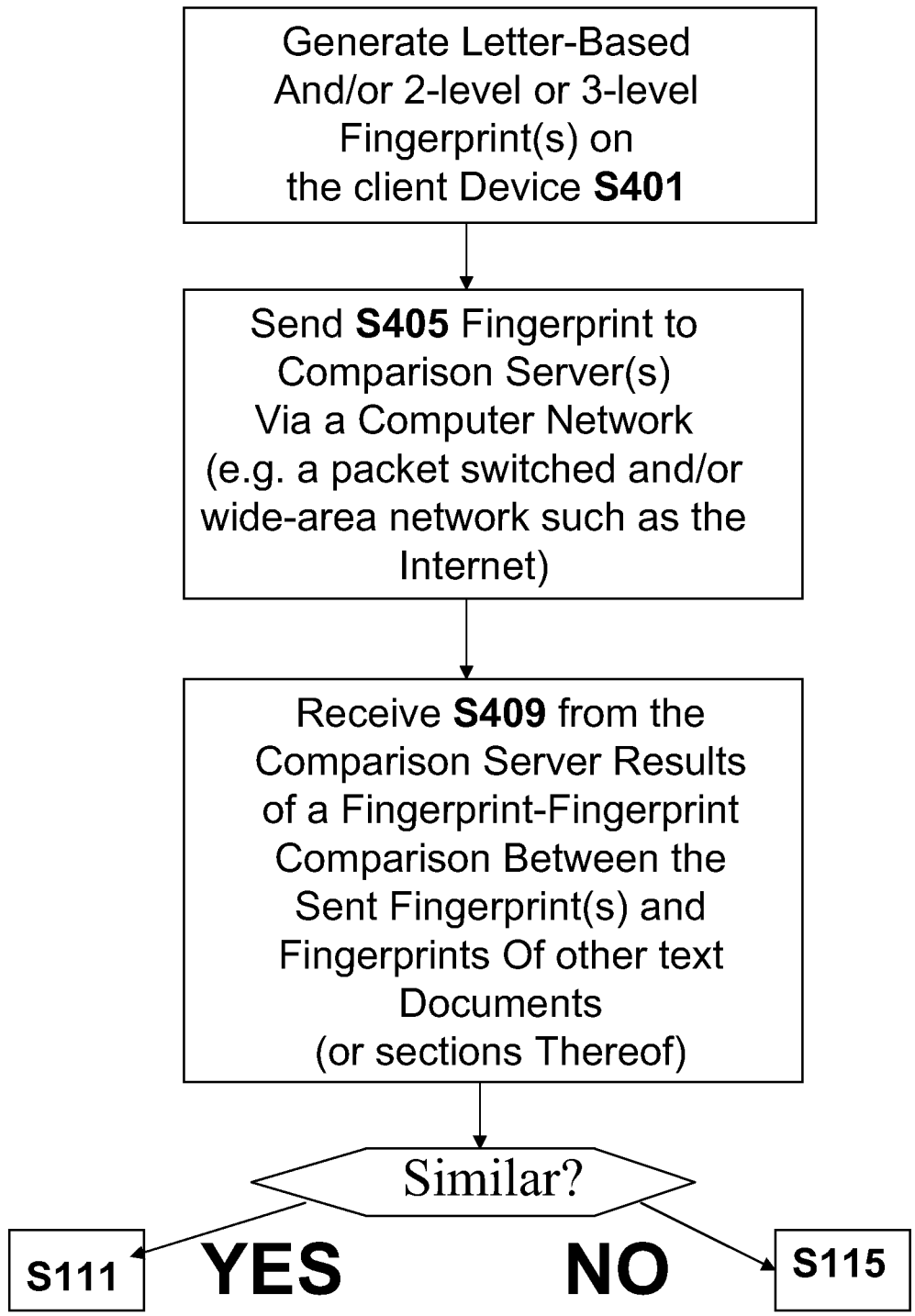
Figure 15:
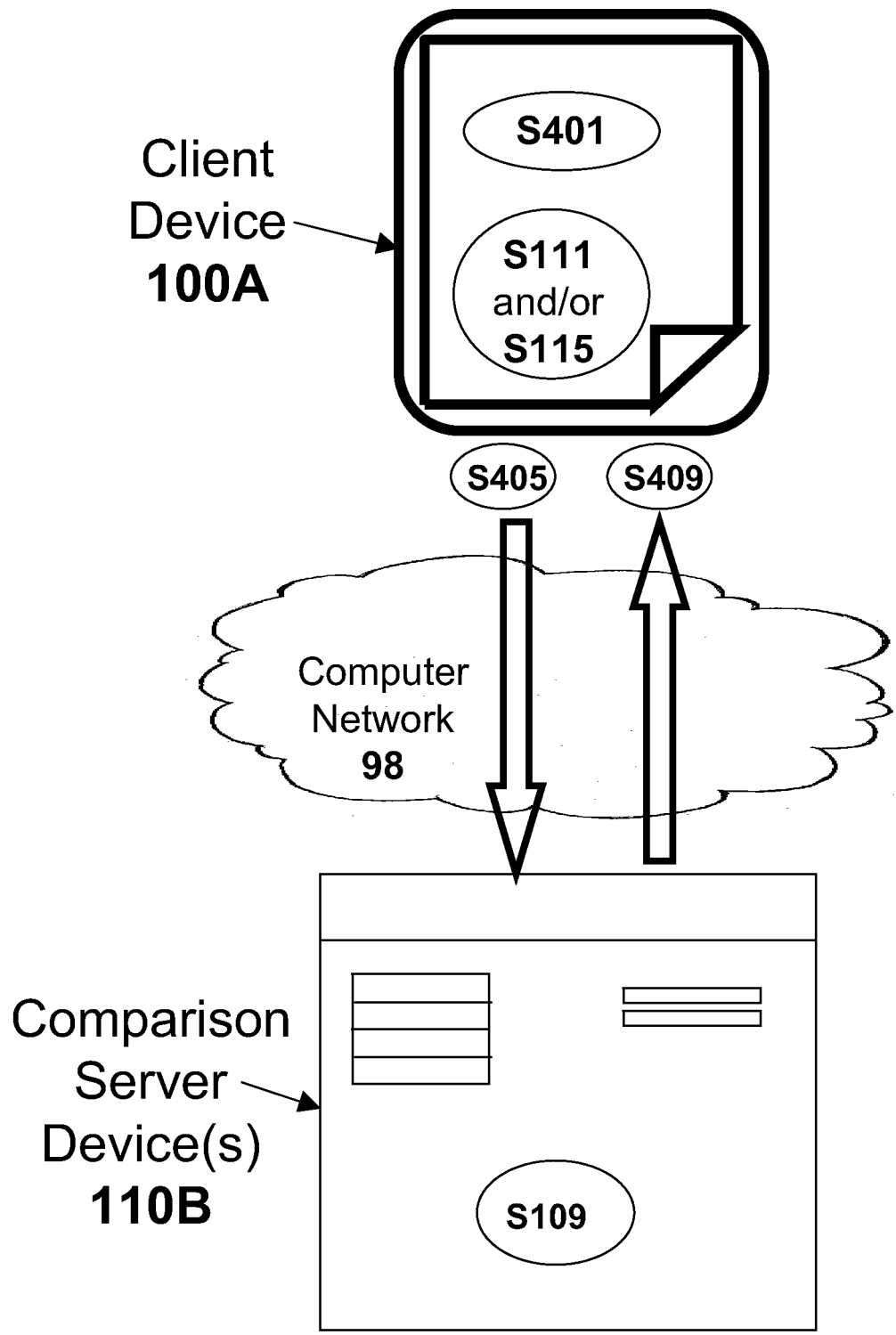
FIG. 15 is a block diagram of a client-server system.

A Discussion of FIG. 14-15

FIGS. 14-15 relate to a 'client-server' system whereby (i) a fingerprint (e.g. letter-based and/or based on a substantially 2-level or 3-level signal) of a natural language text portion is generated on a client device 100A in step S401; (ii) in step S405, the fingerprint data object describing the fingerprint is sent via a computer network 98 (e.g. a wide-area or packet-switched network such as the Internet) from the client device 100A to a server device 110; (iii) in step S409, a comparison between the fingerprint-descriptive sent data object and counterpart(s) generated from 'known texts' (e.g. in fingerprint database 180 of FIG. 13) is carried out to determine (i.e. either exactly or only 'roughly' to some degree of certainty) if the fingerprint generated in step S401 'matches' any fingerprints 190 of the fingerprint database 180.

In some embodiments, the comparison of step S409 (or of step S109 of FIG. 1) is only a rough comparison. In one example, a fingerprint of DCT or DFT coefficients has the values $\{-20,-32,10,-8,10,0\}$ (see FIG. 16—the fingerprint for 2.txt—org)—these values are signal magnitude-phase that are correlated with ranked frequency magnitudes. Thus, the values $\{-20,-32,10,-8,10,0\}$ describe the magnitudes of signal strength (and in addition phase information) at ranked frequencies—the first value '-20' describes the signal strength magnitude at lowest frequency, the second value '-32' describes the signal strength magnitude at the second lowest frequency, and so on.

The ranked frequencies (i.e. lowest, second lowest, etc) are considered a frequency sequence $F_1 \ldots F_N$ of consecutive frequencies, and for all i, $F_i$ and $F_{i+1}$ are consecutive frequencies. The sequence of signal magnitude-phase values that corresponds to the frequency sequence $F_1 \ldots F_N$ may be written as $MAG_1 \ldots MAG_N$. For the example of $\{-20,-32,10,-8,10,0\}$: $MAG_1=-20$, $MAG_2=-32$, $MAG_3=10$, $MAG_4=-8$, $MAG_5=10$ and $MAG_6=0$.

It is possible to characterize trends in the signal-magnitude phase values as a function of ascending or descending consecutive frequencies. For a sequence of signal magnitude-phase values $MAG_1 \ldots MAG_N$ that corresponds to the frequency sequence $F_1 \ldots F_N$, a 'magnitude-phase value trend sequence' describes the trends in consecutive values of the signal magnitude-phase value sequence $MAG_1 \ldots MAG_N$. Mathematically, the 'magnitude-phase value trend sequence' is written as $\{(MAG_2-MAG_1), (MAG_3-MAG_2), \ldots (MAG_N-MAG_{N-1})\}$.

For the example of $\{-20,-32,10,-8,10,0\}$ (see FIG. 16—the fingerprint for 2.txt—org) the 'magnitude-phase value trend sequence' is $\{-12,42,-18,18,-10\}$.

The signs of the 'magnitude-phase value trend sequence' is referred to as the 'magnitude-phase value trend direction sequence' (i.e. defining if the 'direction' of a trend is 'up' or 'down') and may be written as $\{SGN(MAG_2-MAG_1), SGN(MAG_3-MAG_2), \ldots SGN(MAG_N-MAG_{N-1})\}$. For the example of $\{-20,-32,10,-8,10,0\}$ (see FIG. 16—the fingerprint for 2.txt—org) the 'magnitude-phase value trend direction sequence' is $\{down,up,down,up,down\}$ or as $\{0,1,0,1,1\}$.

The 'magnitude-phase value trend direction sequence' is considered a 'rough fingerprint' or a 'coarse grained' or 'limited' description of the fingerprint. One salient feature of the 'relatively rough' 'magnitude-phase value trend direction sequence' description of the fingerprint is that it is, in many examples, much smaller than the 'full description' of the fingerprint. Thus, for the example of {-20,-32,10,-8,10,0}, it is clear that the amount of space required to store {0,1,0,1, 1} is much less than the amount of space required to store {-20,-32,10,-8,10,0}

In one particular example, it is possible to first send in step S405 a 'relatively rough description' of the fingerprint comprising the 'magnitude-phase value trend direction sequence' (or a 'lossless description' thereof). In the event that the 'rough description' matches a 'counterpart' (e.g. for one or any number of 'text windows'), then it is possible to send a 'more complete' description of the fingerprint contingent upon receiving a 'good match' for the 'rough description.'

Referring again to FIG. 14, it is noted that a 'match' would indicate (i.e. with some degree of certainty or confidence— for example, depending on how 'complete' or 'rough' of a fingerprint description is sent for comparison) that the text document portion for which the fingerprint was generated in step S401 is plagiarized text that was plagiarized from a 'known genuine text' used to generate any fingerprint 190 in the database 180.

An indication of results of the comparison is sent to the client device via the network 98 from server 110B. In step S409, client device 100A receives this indication from server 110B.

Example Implementations of Steps S111 and S115 of FIGS. 1 and 15

In some embodiments, in the event that the candidate document (or a portion thereof) is 'similar' or 'too similar' (e.g. for the purpose of plagiarism detection) to one or more of the genuine documents (e.g. according to step S109 of FIG. 1), it is possible to in step S115 carry out one more of the following: (i) refusing to open or display the content of the candidate document, whose display is now contingent upon a determination that the candidate document is not a plagiarized copy of a genuine document; (ii) display a warning message to a user; (iii) send an electronic message to a rights holder of 'genuine' content and/or (iv) present an interface whereby the user may purchase or otherwise acquire 'genuine' access to the genuine content and/or (v) any other action.

In different examples, this may be carried out according to the 'indication' received in step S409 of FIGS. 14-15.

Otherwise, it is possible to carry out another action in step S115. In some embodiments, step S115 includes displaying content of the length-significant portion in a manner that is contingent upon the results of step S109 and/or S409. i.e. the text is only displayed and/or made 'accessible' to the user of client device 100A if the comparison indicates that the 'candidate text' on the client device 100A is sufficiently different from 'known text' (i.e. from which fingerprints 190 are generated and stored in database 180).

Experimental Results for Texts of APPENDIX A

Appendices A-C include three different texts from the same source about the same subject.

Although these texts are from different sources, they relate to essentially the same news story.

Software has been developed which generates a single fingerprint by (i) first identifying letter-based locations of occurrences of only a single single-letter pattern (i.e. the letter 'e'—see FIG. 2A); (ii) computing DCT coefficients of a pattern-occurrence:letter position signal describing these locations to produce a frequency-domain representation of the pattern-occurrence:letter position signal.

Figure 16:
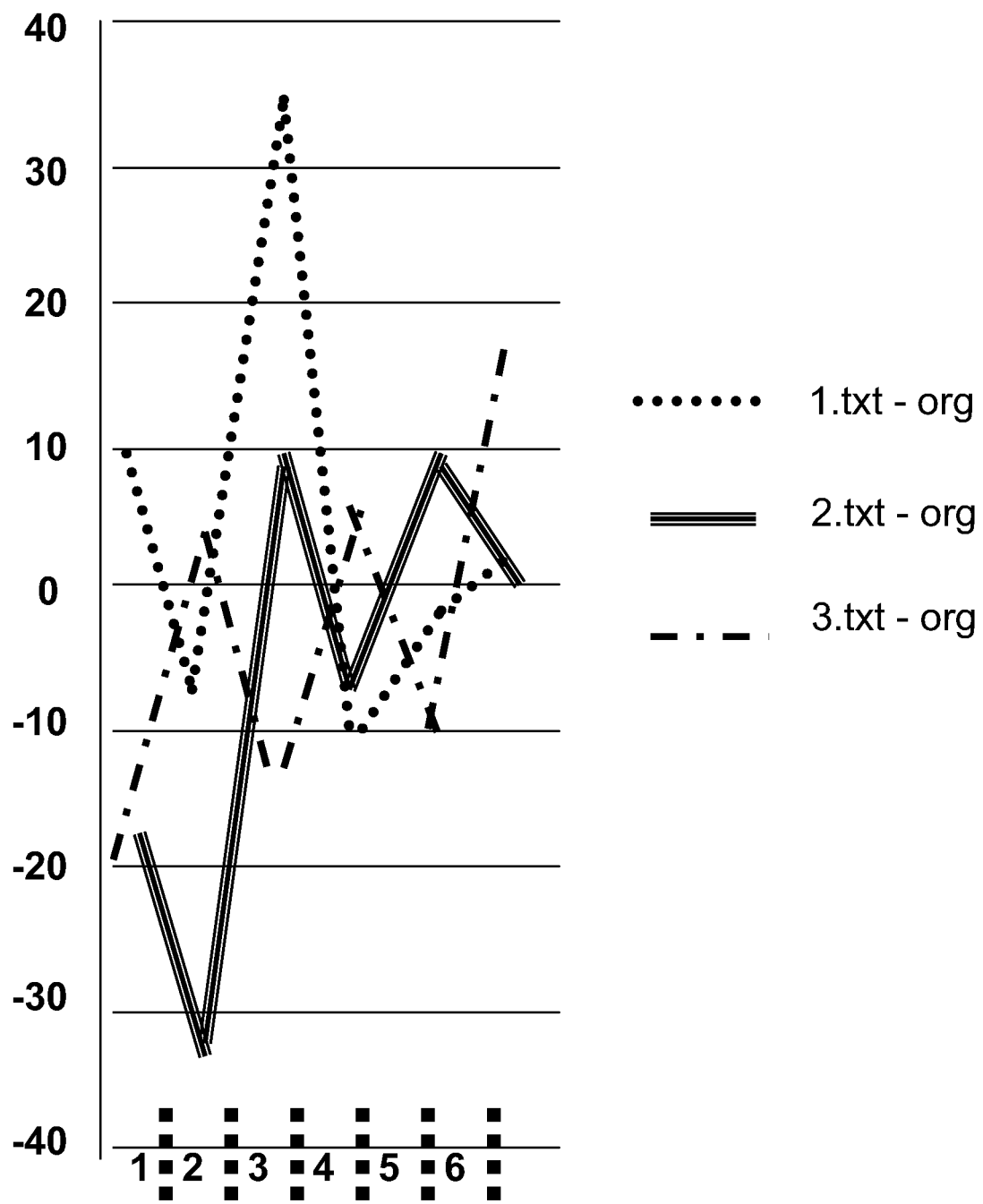
FIGS. 16-19 illustrate experimental results.

FIG. 16 is a graph of six DFT coefficients for these three texts. The lowest DFT coefficient describes a strength of a DC signal and does not appear in any of the graphs; the graphs include the six next DFT coefficients which are the lowest frequency non-DC coefficients. The fingerprints of FIG. 13 were generated from a window whose size is around 2,000 characters. Despite the 'large' size of the windows, the 'fingerprints' are relatively small—e.g. less than 20 bytes.

1.txt represents the text of Appendix A; 2.txt represents the text of Appendix B; 3.txt represents the text of Appendix C. Despite the fact that these texts may include common key words, it is clear that these texts all of noticeably different fingerprints.

Figure 17:
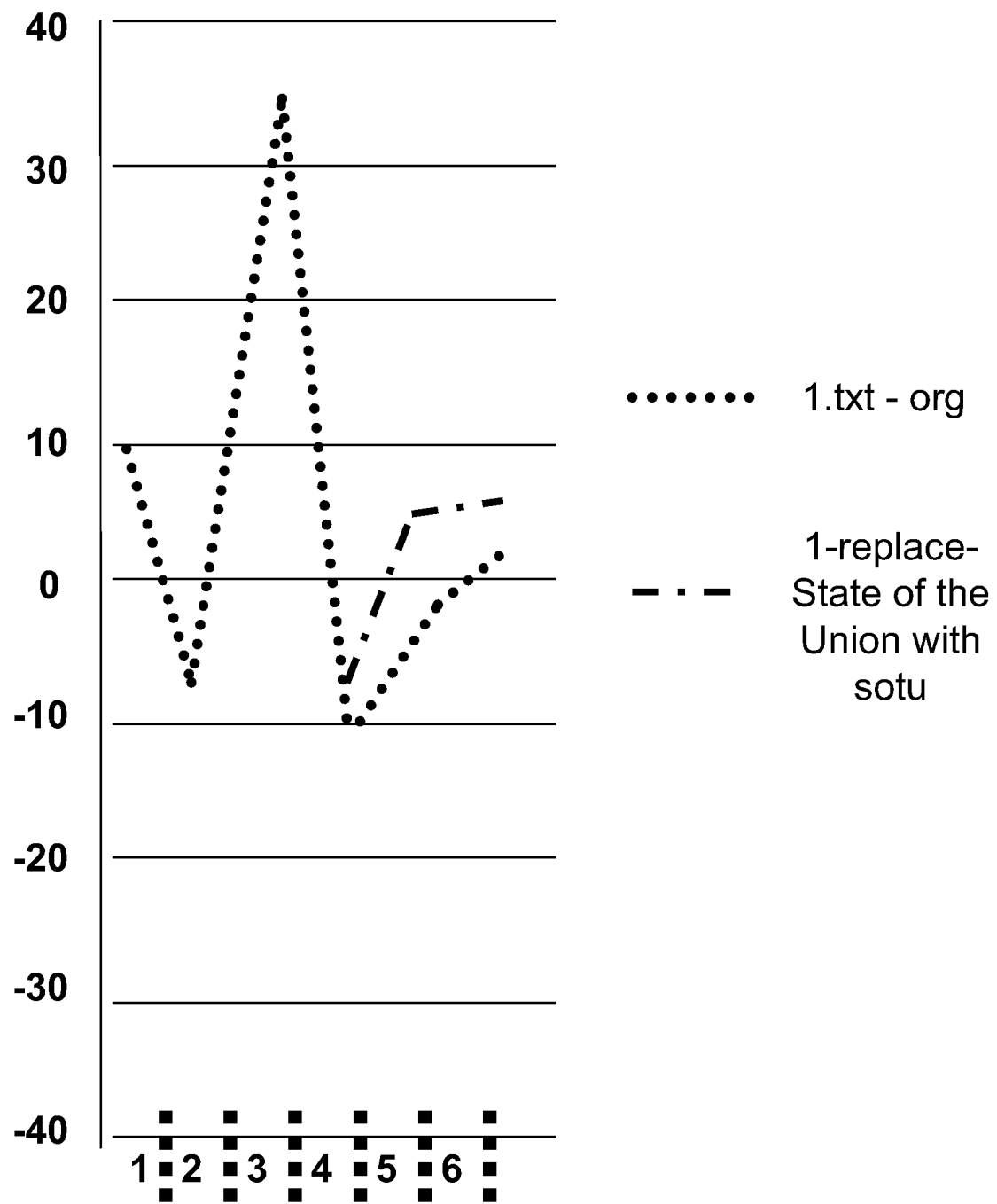

FIG. 17 illustrates two fingerprints on the same set of axes—a fingerprint of the original text 1.txt (see Appendix A), and a fingerprint of a very similar document that is identical to 1.txt except for the fact that the words 'state of the union' have been replaced with 'SOTU.' This replacement reduces the number of words and thus the second fingerprint of FIG. 14 describes a slightly shorter text portion than that of 1.txt. Despite this replacement, the fingerprint technique is relatively 'robust,' and indicates high similarity between the two texts.

Figure 18:
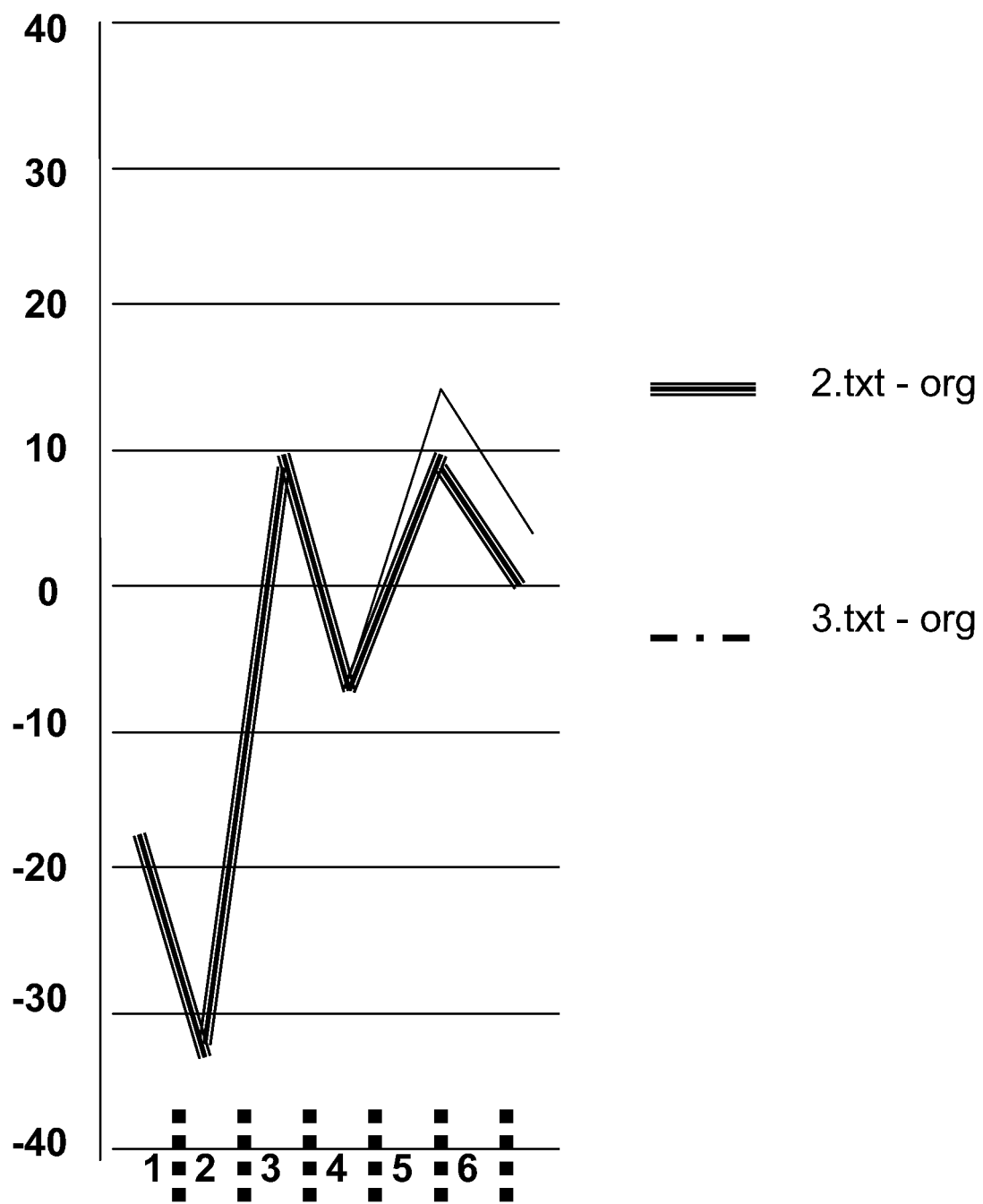
Figure 19:
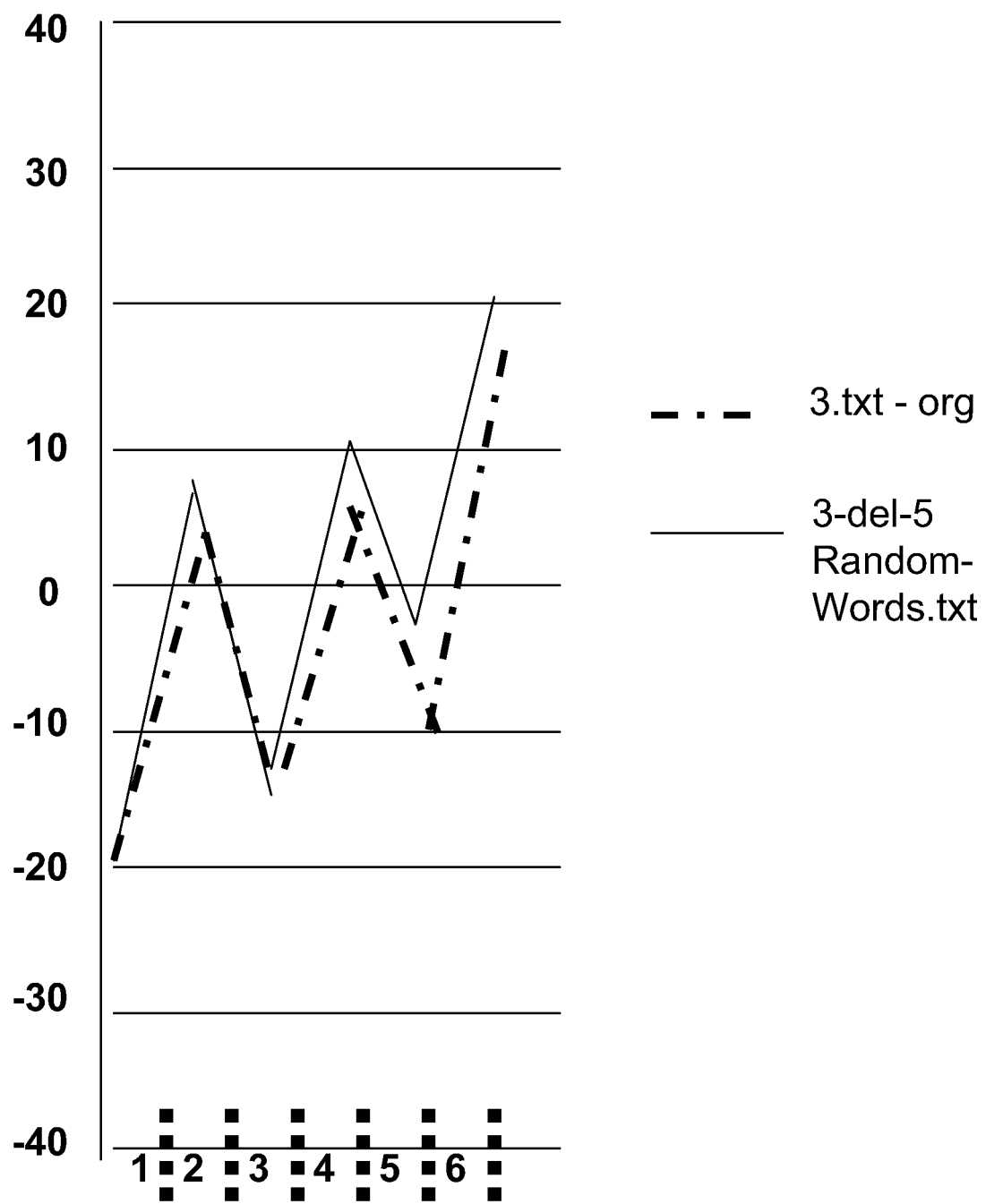

FIGS. 18 and 19 illustrate the same replacement for 2.txt and 3.txt—here too it is possible to see similarities between respective unmodified texts and modified texts.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

Appendix A—A First Sample Representative Text (1.txt)
President Obama Changes Tone Ahead of State of the Union Address
But GOP Leader Mitch McConnell Calls for a Change of Course
On the eve of President Obama's State of the Union address and the end of his first year in office, Republican Scott Brown's astonishing win in the Massachusetts special Senate race not only reset politics in that state, but reset politics for the entire nation.
President will respond to Democratic losses, economy and health care."The entire political community was caught a little bit unawares on that one," White House senior adviser David Axelrod said today on ABC's "This Week" of Brown's win.
After Brown's upset win ended the 60-seat majority in the Senate that Democrats needed in order to push through health care reform without a Republican vote, the White House is adjusting its political operation by bringing in Obama's 2008 presidential campaign manager David Plouffe. The move comes ahead of mid-term elections in the House and Senate this November, where Republicans hope to capitalize on the momentum of Brown's win and pick up more seats, which could further endanger the president's agenda.
"David Plouffe has been a regular adviser to the president throughout the year," White House senior adviser Valerie Jarrett said on NBC's "Meet the Press."
"We have a very strong political operation. What its a reflection of is that David was working on his book for the last year. He's done with that now. He's enormously talented, as everyone knows, and he brings value added to our operation as we look forward, in terms of strategy and tactics, and he'll be consulting with us on that, and we'll be stronger for it," Axelrod said.

Also back were themes from Obama's presidential campaign. "This president's never going to stop fighting to create jobs, to raise incomes, and to push back on the special interests' dominance in Washington and this withering partisanship that keeps us from solving problems," Axelrod said.

Axelrod said those same themes propelled Brown to victory. "This is the Obama who ran for president," he said. "And the themes that he talked about in that campaign were very much echoed by Senator Brown in his campaign, which tells you that the hunger for that kind of leadership is still very strong." In another throwback to campaign rhetoric, on Friday at a town hall meeting in Elyria, Ohio, Obama used the word "fight" more than 20 times.

White House advisers say the president will continue with his current health care reform push despite Brown's win.

"The underlying elements of it are popular and important. And people will never know what's in that bill until we pass it, the president signs it, and they have a whole range of new protections they never had before," Axelrod said.

Yet Senate Minority Leader Mitch McConnell argued Americans were against the Democrats' health care reform initiative, citing a recent Washington Post/Henry J. Kaiser Family Foundation/Harvard University poll of Massachusetts voters that found that 48 percent opposed the health-care proposals advanced by Obama and congressional Democrats while 43 percent of them said they supported them.

"We see it all over the country in tea parties and town halls. People are alarmed and angry about the spending, the debt, the government takeovers," said Sen. Jim DeMint, R-S.C., on ABC.

Obama's advisers say they understand people are frustrated. "I think people are angry in this country—they were angry in Massachusetts—that we haven't made more progress on the economy," White House press secretary Robert Gibbs said on "FOX News Sunday."

"I think we have to stay focused on solving people's problems, and I think the politics will flow from there," Plouffe said in an interview with ABC News.

Obama has an opportunity to address that frustration in his State of the Union address this Wednesday evening, when he can speak directly to the American people "He'll be able to set forth his priorities, and they will be focusing on the middle class. Our middle class is struggling out there. they're frustrated, they're angry, they're working hard to try to make ends meet. They're having to make terrible choices between paying their rent and putting food on the table and paying for their health care and sending their kids to college. These are the same principles that the president advocated in the course of the campaign," Jarrett said, previewing the speech.

"I think the reason that you had the victories in Virginia and New Jersey and most improbably in Massachusetts of all places was the American people are saying, 'We want to go in a different direction.' I hope the president will get the message and change direction, and we'll begin to see that next Wednesday night," McConnell said.

Appendix B—A Second Sample Representative Text (2.txt)
WASHINGTON—President Obama will propose in his State of the Union address a package of modest initiatives intended to help middle-class families, including tax credits for child care, caps on some student loan payments and a requirement that companies let workers save automatically for retirement, senior administration officials said Sunday.

By focusing on what one White House official calls "the sandwich generation"—struggling families squeezed between sending their children to college and caring for elderly parents—Mr. Obama hopes to use his speech on Wednesday to demonstrate that he understands the economic pain of ordinary Americans. The proposals also include expanded tax credits for retirement savings and money for programs to help families care for elderly relatives.

The address is still being written, but one senior official, describing it on the condition of anonymity, said its main themes would include "creating good jobs, addressing the deficit, helping the middle class and changing Washington." With his poll numbers down and Democrats fearing disaster in this year's midterm elections, Mr. Obama is at a particularly rocky point in his presidency and has been shifting his rhetoric lately to adopt a more populist tone. He heads into his first formal State of the Union speech in a radically reshaped political climate from even one week ago.

His top domestic priority, a health care overhaul, is in jeopardy after the Republican victory in last week's Massachusetts Senate race—a setback that White House advisers interpret as a reflection of Americans' deep anger and frustration over high unemployment and Wall Street bailouts.

One advantage of the president's proposals is that they might appeal to people who are struggling financially without looking like the kind of broad expansion of the federal government that is making many Americans uneasy. They also would add little to the federal deficit at a time when Mr. Obama is pledging to reduce it.

Mr. Obama and Vice President Joseph R. Biden Jr. plan to outline the proposals on Monday when they meet with the White House task force that has spent the past year examining ways to help the middle class.

While Mr. Obama has been shifting his focus toward job creation in recent weeks, an official said the president also wanted to spotlight what the White House regards as "critical areas where middle-class families need a helping hand to get ahead," like paying for college and saving for retirement.

For example, the president is calling on Congress to nearly double the child care tax credit for families earning less than $85,000—a proposal that, if adopted, would lower by $900 the taxes such families owe to the government.

But the credit would not be refundable, meaning that families would not get extra money back on a tax refund.

Another of the president's proposals, a cap on federal loan payments for recent college graduates at 10 percent of income above a basic living allowance, would cost taxpayers roughly $1 billion. The expanded financing to help families care for elderly relatives would cost $102.5 million—a pittance in a federal budget where programs are often measured in tens if not hundreds of billions of dollars. And the automatic paycheck deduction program would simply be a way to encourage workers to save, and would include tax credits to help companies with administrative costs.

Such programs are, notably, much less far-reaching than Mr. Obama's expansive first-year agenda of passing an economic recovery package, bailing out the auto industry, overhauling the health care system, passing energy legislation and imposing tough new restrictions on banks. That agenda has left him vulnerable to criticism that he is using the government to remake every aspect of American society.

Top advisers to the president insist that Mr. Obama is not in retreat and are resisting any comparisons to the kind of small-bore initiatives that the last Democratic president, Bill Clinton, used to try to get his presidency back on track.

"In no way does this represent a trimming of the sails," one adviser said on Sunday, referring to the package.

Appendix C—A Third Sample Representative Text (3.txt)
WASHINGTON—Administration officials said yesterday that President Obama would emphasize economic issues in his State of the Union speech on Wednesday but that he would also continue pressing Congress to complete its yearlong effort to enact health care legislation.

The officials acknowledged, however, that the bill's fate is uncertain and the final version may bear little resemblance to the proposal Democrats had been on the verge of passing when Scott Brown's victory in the Massachusetts Senate election gave Republicans the 41st vote they needed to block it.

Obama adviser Valerie Jarrett, speaking on NBC's "Meet the Press," said Democratic leaders are trying to gauge "what the climate is, what's the art of the possible."

Fanning out to defend Obama's first-year record on the Sunday news shows yesterday, White House aides blamed the Democrats' loss of the seat—held for nearly half a century by Edward M. Kennedy—on voter frustration with the economy and anger about special-interest influence in Washington. Obama aide David Axelrod argued that it would be "foolish" politically for Democrats to walk away from health care now. "This thing's been defined by . . . insurance industry propaganda, the propaganda of the opponents, and an admittedly messy process leading up to it," he said on ABC's "This Week."

"But the underlying elements of it are popular and important," Axelrod said. "And people will never know what's in that bill until we pass it, the president signs it, and they have a whole new range of protections they never had before."

Stunned and deeply frustrated that it had been caught flat-footed by Brown's unexpected surge to victory, the White House is seeking to retool the Democratic political machine heading into the midterm elections, enlisting David Plouffe, the political architect of President Obama's campaign for president, to help the party defend its turf.

"He's enormously talented, as everyone knows, and he brings value added to our operation as we look forward, in terms of strategy and tactics," Axelrod said.

But many Democrats saw the Massachusetts election as a clear warning that they must take action on the economy—and fast.

White House advisers argued yesterday that Obama's stimulus package had gone a long way toward preventing catastrophic job loss, that bank and auto bailouts were politically unpopular but necessary, and that the president would offer more initiatives in his speech Wednesday night.

Axelrod did not offer specifics yesterday of the job-creation steps the White House might take, but there have been discussions in Congress of a second economic stimulus package totaling about $175 billion.

In Ohio on Friday, Obama said he is calling on Congress to pass a jobs bill that he says would put more Americans back to work by repairing infrastructure, providing tax breaks to small businesses that hire people, and giving families incentives to make their homes more energy efficient.

Some Republicans, who saw last year's $787 billion economic stimulus as wasteful and considered the bailouts of the auto and banking industries heavy-handed, say the Democratic health care bill shares common problems with Obama's economic policies.

Discuss
COMMENTS (1)

"Massachusetts was a rejection of the president's massive policies of spending and debt," Senator Jim DeMint, Republican of South Carolina, said yesterday on ABC.

Republican leaders invited Democrats to jettison their health care proposal—"The American people are telling us, 'Please stop trying to pass this,'" said Senate Minority Leader Mitch McConnell—and join them in crafting an entirely new bill, starting with a step-by-step approach to containing health costs.

White House aides also called for bipartisanship, pointing to a Washington Post/Kaiser Family Foundation poll conducted after the election that showed three-quarters of those who voted for Brown in the Massachusetts race said they wanted him to work with Democrats to get Republican ideas into legislation, not to simply block Obama's agenda. The aides also noted that the same poll showed support for the Massachusetts health care law, which was a model for the federal proposals, remains high.

"The only difference between Massachusetts and the plan that the president has is the plan the president has puts in strong cost controls that protect families from watching their premiums skyrocket," White House press secretary Robert Gibbs said on "Fox News Sunday."

But the two parties have starkly different approaches to the health care issue and have shown little genuine interest lately in working together. Democrats want to provide health care coverage to as many of the nearly 50 million uninsured Americans as quickly as possible, and to impose tighter regulations on insurance companies.

What is claimed is:

1. A computer-implemented letter-based method of encoding a length-significant portion of natural language text to generate a letter-based fingerprint of the text portion, the method comprising:
   a. detecting, by digital computer, letter-based locations of occurrences of pre-determined single-letter and/or multi-letter pattern(s) within the length-significant portion of the natural language text, the detecting being carried out such that at least some occurrences are detected in a word-boundary independent manner that does not depend on locations of word-word boundaries;
   b. for a pattern occurrence letter-position signal which describes letter positions of the occurrences of the patterns within the text portion, computing frequency-dependent absolute or relative magnitudes of signal strength for a plurality of frequencies, the computed magnitudes representing letter-based frequencies of the pattern occurrences within the natural language text portion; and
   c. storing within volatile and/or non-volatile computer memory descriptions of the computed signal strength magnitudes at the plurality of frequencies, the generated fingerprint comprising the stored signal strength magnitudes, wherein the length-significant portion of natural language text includes at least 250 natural language letters and at least 10 natural language words.

2. The computer-implemented method of claim 1 wherein the signal strength magnitude values are stored in step (c) as part of the generated fingerprint so as to be correlated by frequency.

3. The computer-implemented method of claim 1 wherein the detecting of step (a) is carried out such that a majority of occurrences of the single-letter and/or multi-letter pattern are detected in a word-boundary independent manner.

4. The method of claim 1 wherein the pattern occurrence letter-position signal includes less information than the natural language text portion.

5. The computer-implemented method of claim 1 wherein:
   i. the computing of step (b) includes computing signal strength magnitude-phase values for a frequency sequence FREQ_SEQ of N consecutive frequencies $F_1 \ldots F_N$ to obtain N signal magnitude-phase values $MAG_1 \ldots MAG_N$, N being a positive integer greater than or equal to 3, each magnitude-phase value describing at least a signal strength magnitude;

ii. the method further comprises:

d. computing, for the frequency sequence FREQ_SEQ, a magnitude-phase value trend direction sequence describing signs of changes in the signal magnitude-phase values {SGN($MAG_2$–$MAG_1$), SGN($MAG_3$–$MAG_2$), . . . SGN($MAG_N$–$MAG_{N-1}$)};

e. transmitting, to a comparison server array via a computer network, a first data object comprising a lossless description of the magnitude-phase value trend direction sequence, the first data objecting being a lightweight data object whose size is less than 5 times a minimum data size required to describe the magnitude-phase value trend direction sequence; and f. contingent upon results of a remote comparison between the first data object and respective counterpart(s) that are derived from other natural language text(s), transmitting to the comparison server array a second data object that more completely describes trends in the N signal magnitude-phase values $MAG_1$ . . . $MAG_N$.

6. The method of claim 1 wherein the pattern occurrence position signal is a two-level signal such that:

for a majority of the letter positions within the length-significant portion of natural language text, a value of the pattern occurrence-position signal is substantially equal to one of the two values within a tolerance that does not exceed 20% of a difference between the two values.

7. The method of claim 6 wherein the pattern occurrence position signal is biased so that:

i. the pattern occurrence position signal is substantially equal to a first level selected from the two levels for a fraction of letter positions within the significant portion of natural language text;

ii. the pattern occurrence position signal is substantially equal to a second frequency of letter positions within the significant portion of natural language text, the second level being significantly different from the first level;

iii. the first frequency is between 0.05 and 0.30;

iv. the second frequency exceeds the first frequency; and v. the sum of the first and second frequencies exceeds 0.5 and/or a ratio between the second frequency and the first frequency is at least at least 2:1.

8. The method of claim 1 wherein the method is carried out in response to a user attempt to open for viewing natural language text of the length-significant portion and/or in response to a receiving of the natural language text document into a client device.

9. The method of claim 8 further comprising:

d. contingent upon a comparison of a description of the letter-based fingerprint with a counterpart derived from a different natural language text document different from the text document of the length-significant portion, visually displaying natural language text of the length-significant portion on a visual display device.

10. The method of claim 9 wherein:

i. the computing of step (b) includes computing signal strength magnitude-phase values for a frequency sequence FREQ_SEQ of N consecutive frequencies $F_1$ . . . $F_N$ to obtain N signal magnitude-phase values $MAG_1$ . . . $MAG_N$, N being a positive integer greater than or equal to 3, each magnitude-phase value describing a signal strength magnitude and optionally phase information about its respective frequency;

ii. the method further comprises computing, for the frequency sequence FREQ_SEQ, a magnitude-phase value trend direction sequence describing signs of changes in the signal magnitude-phase values {SGN($MAG_2$–$MAG_1$), SGN($MAG_3$–$MAG_2$), . . . SGN($MAG_N$–$MAG_{N-1}$)} for the frequency sequence FREQ_SEQ of N consecutive frequencies; and iii. the comparison is a relatively rough comparison that compares:

A. a relatively rough description of the letter-based fingerprint comprising a lossless description of the magnitude-phase value trend direction sequence and whose size is less than 5 times the minimum data size required for the magnitude-phase value trend direction sequence; with B. one or more respective counterpart(s) derived from other natural language texts other than the natural language text of the length-significant portion.

11. The method of claim 1 further comprising the steps of:

d. for each different natural language text document of one or more different natural language text document(s) that are different from the natural language text for which the fingerprint was generated in steps a-c:

i. respectively providing, in volatile or non-volatile computer memory, a letter-based fingerprint associated with a portion of the different natural language text document; and ii. comparing, by digital computer, a description of the letter-based fingerprint with counterpart(s) derived from different natural language text document(s) that each differ from the natural language text of the length-significant portion, wherein the counterparts derived from the different natural language text document(s) are selected/and ordered in accordance with estimated likelihood of plagiarism.

12. The method of claim 11 further comprising:

e. contingent upon a detected dissimilarity between the fingerprint generated for the length-significant portion and their counterpart(s) for the different natural language text documents, visually displaying natural language text of the length-significant portion on a visual display device.

13. Apparatus for encoding a length-significant portion of natural language text to generate a letter-based fingerprint of the text portion, the length-significant portion of text including at least 250 natural language letters and at least 10 natural language words, the apparatus comprising:

a. a volatile and/or non-volatile computer memory;

b. a pattern-detection module configured to electronically detect letter-based locations of occurrences of pre-determined letter pattern(s) of one or more letters within the length-significant portion of the natural language text stored within the computer memory, the pattern-detection module configured to carried out the detecting such that at least some of occurrences are detected in a word-boundary independent manner that does not depend on locations of word-word boundaries; and c. a signal analysis module configured to compute, for a pattern occurrence letter-position signal describing letter positions of the occurrences of the patterns within the text portion, absolute or relative magnitudes of signal strength for a plurality of frequencies, the computed magnitudes representing letter-based frequencies of the pattern occurrences within the natural language text portion, wherein the computer memory is configured for storage of the letter-based fingerprint comprising descriptions of the computed signal strength magnitudes at the plurality of frequencies.

14. A computer-implemented letter-based method of encoding a length-significant portion of natural language text to compute a letter-based fingerprint of the text portion, the method comprising:
- a. generating from the length-significant portion of natural language text, by digital computer, a letter-based derivative data object describing letter-based inter-letter distances within the text portion, the generating including the steps of:
  - i. subjecting the text portion to a letter-based transformation operation
  where each source natural language letter is mapped into a respective
  source-letter-identity-dependent target in a manner that does not depend
  upon source letter position within its host word;
  - ii. deriving the letter-based derivative data object according to the individual-letter targets;
- b. for a plurality of different frequencies, computing relative power magnitudes within a frequency domain representation of the derivative data object; and
- c. storing within volatile and/or non-volatile computer memory the letter-based fingerprint describing the computed relative power magnitudes at the plurality of frequencies.

15. The method of claim 14 wherein the letter-based data transformation is a one-way lossy data transformation.

* * * * *

UNITED STATES PATENT AND TRADEMARK OFFICE
CERTIFICATE OF CORRECTION

PATENT NO. : 9,213,847 B2
APPLICATION NO. : 13/997916
DATED : December 15, 2015
INVENTOR(S) : Farkash et al.

Page 1 of 2

It is certified that error appears in the above-identified patent and that said Letters Patent is hereby corrected as shown below:

In the specification,
in column 13, line 36, delete "SIR" and substitute therefor --STR--.
in column 13, line 42, delete "SIR" and substitute therefor --STR--.
in column 14, lines 22-36, delete
"presidentobamachangestonea-
headofstateoftheunionaddressbutgoplea  dermitchmc-
connellcallsforachangeof-
courseontheeveofpresidentobam
asstateoftheunionaddres-
sandtheendofhisfirstyearinofficerepublicansc ottbrown-
sastonishingwininthemassa-
chusettsspecialsenateracenotonlyr
esetpoliticsinthatstatebutre-
setpoliticsfortheentirenationpresidentwill  respondto-
democraticlosseseconomyand-
healthcaretheentirepoliticalco
mmunitywascaughtalittlebi-
tunawaresonthatonewhitehouseseniorsadvis  erdavidax-
elrods"
and substitute therefor
--presidentobamachangestoneaheadofstateoftheunionaddressbutgoplea
dermitchmcconnellcallsforachangeofcourseontheeveofpresidentobam
asstateoftheunionaddressandtheendofhisfirstyearinofficerepublicansc
ottbrownsastonishingwininthemassachusettsspecialsenateracenotonlyr
esetpoliticsinthatstatebutresetpoliticsfortheentirenationpresidentwill
respondtodemocraticlosseseconomyandhealthcaretheentirepoliticalco
mmunitywascaughtalittlebitunawaresonthatonewhitehouseseniorsadvis
erdavidaxelrods--.

Signed and Sealed this
Twelfth Day of April, 2016

Michelle K. Lee
*Director of the United States Patent and Trademark Office*

CERTIFICATE OF CORRECTION (continued)
U.S. Pat. No. 9,213,847 B2

In the specification,
in column 14, lines 42-56, delete
"pres
identobamachangestoneaheadofstateoftheunionaddress
butgoplea dermitchmcconnellcallsfo-
rachangeofcourseontheeveofpresidentobam
asstateoftheunionaddres-
sandtheendofhisfirstyearinofficerepublicansc ottbrown-
sastonishingwininthemassa-
chusettsspecialsenateracenotonlyr
esetpoliticsinthatstatebutre-
setpoliticsfortheentirenationpresidentwill respondto-
democraticlosseseconomyand-
healthcaretheentirepoliticalco
mmunitywascaughtalittlebi-
tunawaresonthatonewhitehouseseniorad vis erdavidax-
elrods"
and substitute therefor
--presidentobamachangestoneaheadofstateoftheunionaddressbutgoplea
dermitchmcconnellcallsforachangeofcourseontheeveofpresidentobam
asstateoftheunionaddressandtheendofhisfirstyearinofficerepublicansc
ottbrownsastonishingwininthemassachusettsspecialsenateracenotonlyr
esetpoliticsinthatstatebutresetpoliticsfortheentirenationpresidentwill
respondtodemocraticlosseseconomyandhealthcaretheentirepoliticalco
mmunitywascaughtalittlebitunawaresonthatonewhitehouseseniorad vis
erdavidaxelrods--.
in column 14, line 57, delete "SIR" and substitute therefor --STR--.
in column 14, line 61, delete "SIR" and substitute therefor --STR--.
in column 14, line 62, delete "SIR" and substitute therefor --STR--.
in column 15, line 23, delete "SIR" and substitute therefor --STR--.
in column 15, line 31, delete "SIR" and substitute therefor --STR--.
in column 16, line 7, delete "SIR" and substitute therefor --STR--.
in column 16, line 38, delete "SIR" and substitute therefor --STR--.
in column 16, line 44, delete "SIR" and substitute therefor --STR--.
in column 16, line 49, delete "Ski" and substitute therefor --S[i]--.
in column 16, line 61, delete "SIR" and substitute therefor --STR--.
in column 17, line 14, delete "SIR" and substitute therefor --STR--.
in column 17, line 31, delete "SIR" and substitute therefor --STR--.
in column 17, line 50, delete "SIR" and substitute therefor --STR--.

In the claims,
in column 27, line 28, (sixth line of claim 6), delete "of the two" and substitute therefor
--of two--.